(12) United States Patent
Li

(10) Patent No.: US 7,310,589 B2
(45) Date of Patent: Dec. 18, 2007

(54) PROCESSING OF VIDEO CONTENT

(75) Inventor: Baoxin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 486 days.

(21) Appl. No.: 10/978,173

(22) Filed: Oct. 30, 2004

(65) Prior Publication Data

US 2005/0086027 A1    Apr. 21, 2005

Related U.S. Application Data

(63) Continuation of application No. 10/404,987, filed on Mar. 31, 2003, now Pat. No. 7,006,945.

(51) Int. Cl.
*G06F 15/00* (2006.01)
(52) U.S. Cl. .................................... 702/179; 345/473
(58) Field of Classification Search ................ 702/189, 702/179, 181, 182–185, 199; 345/461, 473
See application file for complete search history.

(56) References Cited

U.S. PATENT DOCUMENTS

| 4,183,056 | A | 1/1980 | Evans et al. |
|---|---|---|---|
| 4,253,108 | A | 2/1981 | Engel |
| 4,298,884 | A | 11/1981 | Reneau |
| 4,321,635 | A | 3/1982 | Tsuyuguchi |
| 4,324,402 | A | 4/1982 | Klose |
| 4,520,404 | A | 5/1985 | Von Kohorn |
| 4,729,044 | A | 3/1988 | Kiesel |
| 4,937,685 | A | 6/1990 | Barker et al. |
| 5,012,334 | A | 4/1991 | Etra |
| 5,027,400 | A | 6/1991 | Baji et al. |
| 5,101,364 | A | 3/1992 | Davenport et al. |
| 5,109,482 | A | 4/1992 | Bohrman |
| 5,148,154 | A | 9/1992 | MacKay et al. |
| 5,200,825 | A | 4/1993 | Perine |
| 5,222,924 | A | 6/1993 | Shin et al. |
| 5,241,671 | A | 8/1993 | Reed et al. |
| 5,288,069 | A | 2/1994 | Matsumoto |
| D348,251 | S | 6/1994 | Hendricks |
| 5,333,091 | A | 7/1994 | Iggulden et al. |
| 5,339,393 | A | 8/1994 | Duffy et al. |
| D354,059 | S | 1/1995 | Hendricks |
| 5,381,477 | A | 1/1995 | Beyers, II et al. |
| 5,404,316 | A | 4/1995 | Klingler et al. |
| 5,410,344 | A | 4/1995 | Graves et al. |
| 5,424,770 | A | 6/1995 | Schmelzer et al. |
| 5,434,678 | A | 7/1995 | Abecassis |

(Continued)

FOREIGN PATENT DOCUMENTS

EP        1250807        10/2002

(Continued)

OTHER PUBLICATIONS

"User Preference Description for MPEG-7," ISO/IEC JTC1/SC29/WG11, MPEG 99/MXXXX, Maui, Hawaii, Dec. 1999, pp. 1-18.

(Continued)

*Primary Examiner*—Edward Raymond
(74) *Attorney, Agent, or Firm*—Chernoff, Vilhauer, McClung & Stenzel

(57) ABSTRACT

Processing of video content including sports.

4 Claims, 19 Drawing Sheets

U.S. PATENT DOCUMENTS

| | | |
|---|---|---|
| 5,444,499 A | 8/1995 | Saitoh |
| 5,452,016 A | 9/1995 | Ohara et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,574,845 A | 11/1996 | Benson et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,724,472 A | 3/1998 | Abecassis |
| 5,727,129 A | 3/1998 | Barrett et al. |
| 5,734,853 A | 3/1998 | Hendricks et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,778,108 A | 7/1998 | Coleman, Jr. |
| 5,781,188 A | 7/1998 | Amiot et al. |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojeric et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A | 3/1999 | Newlin et al. |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,011,895 A | 1/2000 | Abecassis |
| 6,014,183 A | 1/2000 | Hoang |
| 6,020,883 A | 2/2000 | Herz et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,060,167 A | 5/2000 | Morgan et al. |
| 6,064,385 A | 5/2000 | Sturgeon et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papierniak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,160,989 A | 12/2000 | Hendricks et al. |
| 6,161,142 A | 12/2000 | Wolfe et al. |
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 | 4/2001 | Yeo et al. |
| 6,226,678 B1 | 5/2001 | Mattaway et al. |
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |

| | | |
|---|---|---|
| 6,236,395 B1 | 5/2001 | Sezan et al. |
| 6,240,406 B1 | 5/2001 | Tannen |
| 6,252,444 B1 | 6/2001 | Lee |
| 6,252,544 B1 | 6/2001 | Hoffberg |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | DeVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,339,842 B1 | 1/2002 | Fernandez et al. |
| 6,342,904 B1 | 1/2002 | Vasudevan et al. |
| 6,363,160 B1 | 3/2002 | Bradski et al. |
| 6,370,504 B1 | 4/2002 | Zick et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,487,390 B1 | 11/2002 | Virine et al. |
| 6,498,783 B1 | 12/2002 | Lin |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,658,095 B1 | 12/2003 | Yoakum et al. |
| 6,665,423 B1 | 12/2003 | Mehrotra et al. |
| 6,678,635 B2 | 1/2004 | Tovinkere et al. |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 | 2/2004 | Divakaran et al. |
| 6,704,929 B1 | 3/2004 | Ozer et al. |
| 6,724,933 B1 | 4/2004 | Lin et al. |
| 6,754,904 B1 | 6/2004 | Cooper et al. |
| 6,754,906 B1 | 6/2004 | Finseth et al. |
| 6,766,362 B1 | 7/2004 | Miyasaka et al. |
| 6,774,917 B1 | 8/2004 | Foote et al. |
| 6,820,278 B1 | 11/2004 | Ellis |
| 6,829,781 B1 | 12/2004 | Bhagavath et al. |
| 6,868,440 B1 | 3/2005 | Gupta et al. |
| 6,880,171 B1 | 4/2005 | Ahmad et al. |
| 6,925,455 B2 | 8/2005 | Gong et al. |
| 6,931,595 B2 | 8/2005 | Pan et al. |
| 6,970,510 B1 | 11/2005 | Wee et al. |
| 6,981,129 B1 | 12/2005 | Boggs et al. |
| 6,993,245 B1 | 1/2006 | Harville |
| 7,199,798 B1 * | 4/2007 | Echigo et al. ............ 345/473 |
| 2001/0030664 A1 | 10/2001 | Shulman et al. |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0097165 A1 | 7/2002 | Hulme |
| 2002/0120929 A1 | 8/2002 | Schwalb et al. |
| 2002/0133412 A1 | 9/2002 | Oliver et al. |
| 2002/0141619 A1 | 10/2002 | Standridge et al. |
| 2002/0156909 A1 | 10/2002 | Harrington |
| 2002/0178135 A1 | 11/2002 | Tanaka |
| 2002/0184220 A1 | 12/2002 | Teraguchi et al. |
| 2002/0190991 A1 | 12/2002 | Efran et al. |
| 2002/0194589 A1 | 12/2002 | Cristofalo et al. |
| 2003/0001880 A1 | 1/2003 | Holtz et al. |
| 2003/0007555 A1 | 1/2003 | Divakaran et al. |
| 2003/0026592 A1 | 2/2003 | Kawahara et al. |
| 2003/0072440 A1 | 4/2003 | Murray et al. |
| 2003/0081937 A1 | 5/2003 | Li |
| 2003/0105682 A1 | 6/2003 | Dicker et al. |
| 2003/0182663 A1 | 9/2003 | Gudorf et al. |
| 2003/0187650 A1 | 10/2003 | Moore et al. |
| 2003/0229900 A1 | 12/2003 | Reisman |
| 2004/0003041 A1 | 1/2004 | Moore et al. |
| 2004/0015569 A1 | 1/2004 | Lonnfors et al. |
| 2004/0017389 A1 | 1/2004 | Pan et al. |
| 2004/0030750 A1 | 2/2004 | Moore et al. |
| 2004/0032486 A1 | 2/2004 | Shusman |
| 2004/0088289 A1 | 5/2004 | Xu et al. |
| 2004/0098754 A1 | 5/2004 | Vella et al. |
| 2004/0125124 A1 | 7/2004 | Kim et al. |
| 2004/0125877 A1 | 7/2004 | Chang et al. |
| 2004/0197088 A1 | 10/2004 | Ferman et al. |
| 2004/0227768 A1 | 11/2004 | Bates et al. |
| 2004/0231003 A1 | 11/2004 | Cooper et al. |
| 2005/0102202 A1 | 5/2005 | Linden et al. |

FOREIGN PATENT DOCUMENTS

| | | |
|---|---|---|
| JP | 08125957 | 5/1996 |
| JP | 09322154 | 12/1997 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |
| WO | WO 94/14284 | 6/1994 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

"A Proposal for User Preference Descriptions in MPEG-7," ISO/IEC JTC1SC29/WG11 M5222, MPEG 99, Oct. 4, 1999, pp. 1-6.

Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.

Peng Xu, et al., "Algorithms and System for High-Level Structure Analysis and Even Detection in Soccer Video," Columbia University, ADVENT—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN195rl myTV project," NDS Systems Division, NDS Limited 2000, 28 pages.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1, pp. 169-176.

Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.

T. Lambrou, et al., "Classification of Audio Signals Using Statistical Features on Time and Wavelet Transform Domains," 1998 IEEE, pp. 3621-3624.

Joshua Alspector,et al., "Comparing Feature-based and Clique-based User Models for Movie Selection," Digital Libraries 98, Pittsburgh, PA, Copyright ACM 1998, pp. 11-18.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

John Canny, "A Computational Approach to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20, 2000, Version 1.0, International digital Enterprise Alliance, Inc. (IDEAlliance), pp. 1-127.

Jane Hunter (DSTC Pty Ltd), Editor, "DDL Working Draft 3.0," ISO/IEC JTC1/SC29/WG11 N3391, MPEG 00/May 2000 (Geneva), 23 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (in Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

FAP Specifications, MPEG-4 Compliant Facial Animation, http://www.dsp.dist.unige.it/~pok/RESEARCH/MPEG/fapspec.html, 4 pages.

Frank R. Kschischang, et al., "Factor Graphs and the Sum-Product Algorithm," IEEE Transactions on Information Theory, vol. 47, No. 2, Feb. 2001, pp. 498-519.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

B. B. Chaudhuri, et al., "Improved fractal geometry based texture segmentation technique," IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaldo University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98, Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Noboru Babaguchi, et al., "Linking Live and Replay Scenes in Broadcasted Sports Video," ACM Multimedia Workshop, Marina Del Rey, CA, USA, Copyright ACM 2000, pp. 205-208.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0.5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG7 Media/META DSs and Harmonization with other Schemes, "MPEG-7 Media/Meta DSs upgrade (V0.2)," ISO/IEC JTC1/SC29/WG11 MXXXX, MPEG 99 Oct. 1999, Melbourne, pp. 1-17.

Peter Van Beek, et al, Editors, "MPEG-7 Multimedia Description Schemes WD (Version 3.0)," ISO/IEC JTC 1/SC 29/WG 11/N3411, May 2000, Geneva.

Peter Van Beek, et al., Editors, "MPEG-7 Multimedia Description Schemes XM (Version 3.0)," ISO/IEC JTC 1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin, et al., Editors, "MPEG-7 Visual Part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.

Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology—Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Michael Ehrmantraut, et al., "The Personal Electronic Program guide—Towards the Pre-selection of Individual TV Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computer (1994) 5, pp. 267-286.

Jin-Soo Lee, et al. Editors, "Specification of The UsageHistory DS," ISO/IEC JTC 1/SC 29/WG 11/M5748, Mar. 2000, Noordwijkerhout, pp. 1-6.

Lexing Xie, et al., "Structure Analysis of Soccer Video with Hidden Markov Models," Department of Electrical Engineering, Columbia University, New York, NY, 4 pages.

Selim Aksoy, et al., "Textural Features for Image Database Retrieval," Intelligent Systems Laboratory, Department of Electrical Engineering, University of Washington, Seattle, WA 98195-2500, 5 pages.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Ted Lewis, "UbiNet: The Ubiquitous Internet Will Be Wireless,"DaimlerChrysler Research & Technology North America, 3 pages, date unknown.

Richard O. Duda et al., "Use of the Hough Transformation To Detect Lines and Curves in Pictures," Communications of the ACM, Jan. 1972, vol. 15, No. 1, pp. 11-15.

"User Preference Descriptions for MPEG-7," ISO/IEC JTC1/SC29/WG11, MPEG 99/MXXXX, Maui, Hawaii, Dec. 1999, pp. 1-18.

Rainer Lienhart, et al., "Video Abstracting," Communications of the ACM, Dec. 1997/ vol. 40, No. 12, pp. 55-62.

Shingo Uchihashi, et al., "Video Manga: Generating Semantically Meaningful Video Summaries,"FX Palo Alto Laboratory, 3400 Hillview Avenue, Palo Alto, CA 94304, USA, pp. 383-392.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Ken Masumitsu, et al., "Video Summarization Using Reinforcement Learning in Eigenspace," IBM Research, Tokyo Research Laboratory, 1623-14, Shimotsuruma, Yamato-shi, Kanagawa, Japan, 4 pages.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies," C&C Research Laboratories, NEC USA, Inc., 110 Rio robles, San Jose, CA 95134, USA, 2001 IEEE, pp. 362-365.

Minerva M. Yeung et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick,"0 Dept. of EE, Pohang University of Science and Technology, San 31 Hyoja Dong, Pohang, 790-784, Repbulic of Korea, pp. 1-15.

http://web.archive.org/web/20001017172449/http://www.pvi.inc.com/.

David Beech, et al., editors, "XML Schema Part 1: Structures," http://www.w3.org/1999/05/06-xmlschema-1/, W3C Working Draft, May 6, 1999, 67 pages.

Paul V. Birch, et al., editors, "XML Schema Part 2: Datatypes, World Wide Web Consortium Working Draft," May 6, 1999, http://www.w3.org/1999/05/06-xmlschema-2/, 37 pages.

Boreczky, John S. and Wilcox, Lynn D., *A Hidden Markov Model Framework for Video Segmentation Using Audio and Image Features,*, FX Palo Alto Laboratory article, four pages.

Kobla, Vikrant, et. al., *Detection of Slow-Motion Replay Sequences for Identifying Sports Videos*, Laboratory for Language and Media Processing, University of Maryland article, six pages.2.

Intille, Stephen S., *Tracking Using a Local Closed-World Assumption: Tracking in the Football Domain*, partial masters thesis submitted to Media Arts & Sciences, School of Architecture and Planning Aug. 5, 1994, consisting of 62 pages.

Kobla, Vikrant, et. al., *Identifying Sports Videos Using Reply, Text, and Camera Motion Features*, Laboratory for Language and Media Processing, University of Maryland, consisting of 12 pages.

Levinson, S.E., Rabiner, L.R. and Sondhi, M.M., *An Introduction to the Application of the Theory of Probabilistic Functions of a Markov Process to Automatic Speech Recognition*, The Bell System Technical Journal, Vo. 62, No. 4, Apr. 1983, pp. 1035-1074.

Saur, Drew D., et. al., *Automated Analysis and Annotation of Basketball Video*, SPIE vol. 3022, pp. 176-187.

Yow, Dennis, et. al., *Analysis and Presentation of Soccer Highlights from Digital Video*, Asian Conference on Computer Vision, 1995, consisting of five pages.

Golin, Stuart J., *New Metric to Detect Wipes and Other Gradual Transitions in Video*, SPIE vol. 3656, Jan. 1999, pp. 1464-1474.

Courtney, Jonathan D., *Automatic Video Indexing Via Object Motion Analysis*, Pattern Recognition, vol. 30, No. 4, pp. 607-625, 1997.

\* cited by examiner

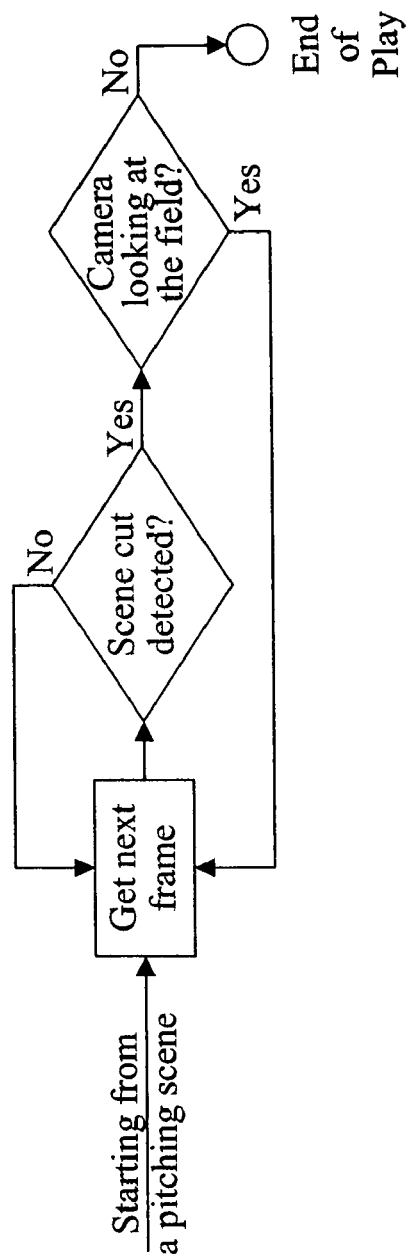
FIG. 27
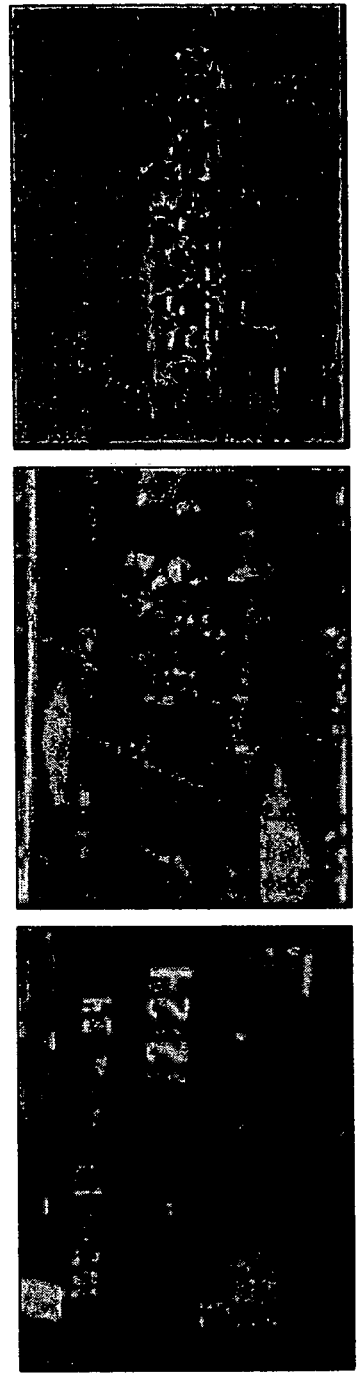
FIG. 28A
FIG. 28B
FIG. 28C

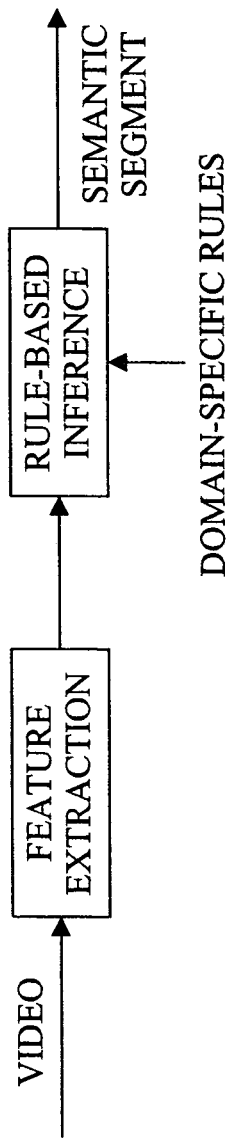
FIG. 29
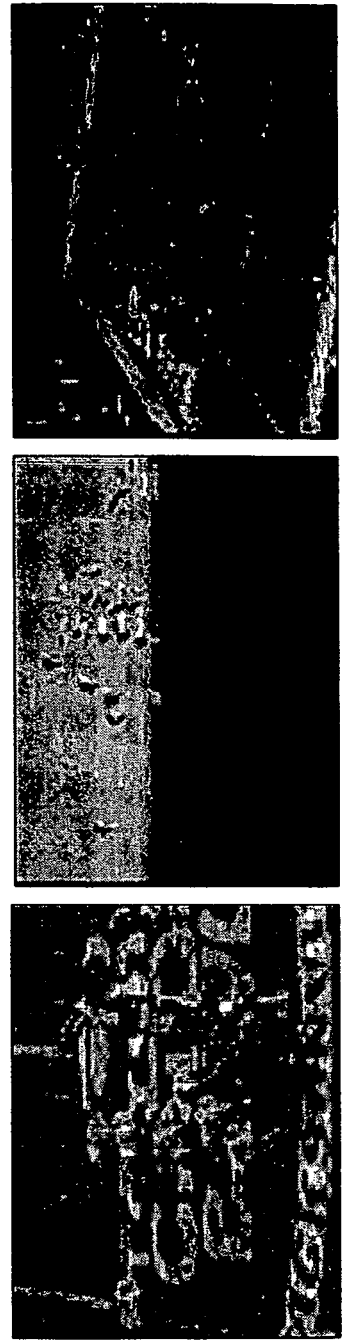
FIG. 30A
FIG. 30B
FIG. 30C

PROCESSING OF VIDEO CONTENT

CROSS-REFERENCE TO RELATED APPLICATIONS

This application is a continuation of U.S. patent application Ser. No. 10/404,987 filed Mar. 31, 2003, now U.S. Pat. No. 7,006,945.

BACKGROUND OF THE INVENTION

The present invention relates to processing of video content.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are three major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

The third approach for video summarization is manual segmentation of the video. In this manner each portion of the video that is determined to be of interest is selected. The selected segments of the video are then grouped together to form a video sequence comprising the selected segments. In some cases a new video sequence is constructed from the selected segments, and in other cases the segments are identified in the existing sequence so that they may be viewed in sequence (while not viewing the non-selected segments).

What is desired, therefore, is a video processing technique suitable for video.

BRIEF DESCRIPTION OF THE DRAWINGS

FIG. 27 is an exemplary flow chart for determining the end of a play.

FIG. 28 illustrates three constituent shots of the same play (from left to right): scoreboard, sideline shot, and end-zone shot.

FIG. 29 illustrates components of a deterministic approach FIG. 30 illustrates abnormal frame (logo overlay on the field, shadow, distorted color, etc) for using percentage of green pixels in detecting an SL/EZ shot.

DETAILED DESCRIPTION OF THE PREFERRED EMBODIMENT

Sumo Wrestling

Figure 1A:
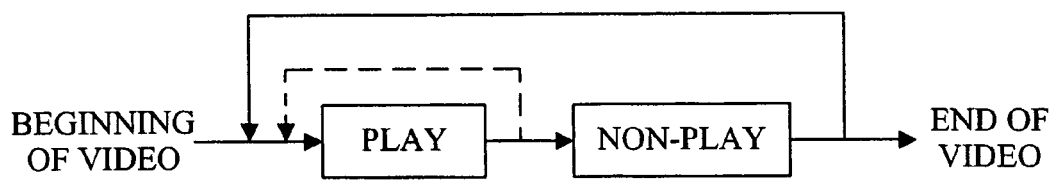
FIG. 1A is an exemplary flowchart for play and non-play detection.

Sumo, the national sport of Japan, is tremendously popular in eastern Asia and is growing in popularity elsewhere in the world. Sumo is a sport comprising bouts in which two contestants meet in a circular ring 4.55 meters in diameter. The rules of Sumo are uncomplicated. After the contestants and a referee have entered the circular ring, the bout begins with an initial charge—called a "tachiai"—where each contestant rushes towards, then collides with, the other. The bout will end when one of the contestant loses by either stepping outside the circular ring or touching the ground with any part of the contestant's body other than the soles of the feet. Aside from a limited number of illegal moves, such as gouging the opponent's eyes, striking with a closed fist, or intentionally pulling at the opponent's hair, there are no rules that govern a sumo bout.

Sumo participants may compete against each another in one of a number of tournaments. Japan sponsors six sanctioned Grand Sumo tournaments, held in odd-numbered months throughout the year, in which competitive sumo contestants face one another with the opportunity for advancement in rank. Sumo contestants are ranked under a strict meritocracy; winning bouts in these sanctioned tournaments improves a competitor's rank while losing bouts diminishes that rank. Aside from the six sanctioned tournaments, a number of exhibition tournaments—called Jungyo—are scheduled throughout the year.

Though a sumo tournament will typically take place over several weeks with bouts scheduled throughout each day, most bouts of interest, i.e. those involving higher ranked contestants, are scheduled to begin late afternoon when live television broadcasts of the tournament occur. These portions of the sumo tournaments usually last 2-3 hours each day and are often video recorded for later distribution or for re-broadcast.

Though such a video of a sumo tournament might typically last about 2-3 hours, only about ten minutes turns out to include time during which two players are in a bout. An individual sumo bout is brief; the typical bout will end with the initial collision, though a rare bout might last two to three minutes. Interspersed between bouts are a large number of ceremonies that precede and follow each bout.

Though brief, the time intervals during which a bout is proceeding are intense and can captivate those in the viewing audience, many of whom are able to identify a myriad of named sumo techniques that may occur in rapid succession. Such techniques include a "kekaeshi" (a foot-sweep), a "kubinage" (a head-lock throw), and an "izori" (a technique where a contestant crouches below the opponent's rush, grabbing one of the opponent's legs, lifting the opponent upon the shoulders and falling backwards), as well as some sixty five to seventy more named sumo techniques or occurrences.

The remaining time during the sumo tournament is typically not exciting to watch on video. Such time would include for example inter-bout changes of players, pre-bout exercises and ceremonies, post-bout ceremonies and in the case of broadcast, nearly endless commercials. While it may indeed be entertaining to sit in an arena for several hours for a sumo tournament, many people who watch a video of a sumo tournament find it difficult to watch all of the tournament, even if they are rabid fans. Further, the tournaments are held during daytime hours, hence many fans are unable to attend a tournament or to watch a live broadcast due to work. Such fans may nonetheless be interested in watching specific bouts or some other condensed version of the tournament. Thus a video summarization of the sumo tournament that provides a summary of the tournament having a duration shorter than the original sumo video, may be appealing to many people. The video summarization should provide nearly the same level of the excitement (e.g. interest) that the original game provided.

Upon initial consideration, sumo would not be a suitable candidate to attempt automated video summarization. Initially, there are nearly an endless number of potential moves that may occur that would need to be accounted for in some manner. In addition, each of these moves may involve significant player motion that is difficult to anticipate, difficult to track, and is not consistent between plays. In addition, the players are flesh toned and the ring is likewise generally flesh toned making identification of the events difficult. Based upon such considerations it has been previously considered impractical, if not impossible, to attempt to summarize sumo.

It is conceivably possible to develop highly sophisticated models of a typical sumo video to identify potentially relevant portions of the video. However, such highly sophisticated models are difficult to create and are not normally robust. Further, the likelihood that a majority of the highly relevant portions of the sumo video will be included in such a video summarization is low because of the selectivity of the model. Thus the resulting video summarization of the sumo tournament may simply be unsatisfactory to the average viewer.

Baseball

A typical baseball game lasts about 3 hours of which only about one hour turns out to include time during which the ball is in action. The time during which the ball is in action is normally the exciting part of the game, such as for example, pitching the ball to the batter, hitting a home run, hitting the ball, running the bases, a pitch to first base, pitching a "foul" ball, pitching a "strike" ball, pitching a "ball", fouling the ball to the bleachers, catching a pop fly, etc. The remaining time during the baseball game is typically not exciting to watch on video, such as for example, nearly endless commercials, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to sit in a stadium for three hours for a one hour baseball game, many people who watch a video of a baseball game find it difficult to watch all of the game, even if they are loyal fans. A video summarization of the baseball video, which provides a summary of the game having a duration shorter than the original baseball video, may be appealing to many people. The video summarization should provide nearly the same level of the excitement (e.g. interest) that the original game provided.

It is possible to develop highly sophisticated models of a typical baseball video to identify potentially relevant portions of the video. However, such highly sophisticated models are difficult to create and are not normally robust.

Further, the likelihood that a majority of the highly relevant portions of the baseball video will be included in such a video summarization is low because of the selectivity of the model. Thus the resulting video summarization of the baseball game may simply be unsatisfactory to the average viewer.

Football

A typical football game lasts about 3 hours of which only about one hour turns out to include time during which the ball is in action. The time during which the ball is in action is normally the exciting part of the game, such as for example, a kickoff, a hike, a pass play, a running play, a punt return, a punt, a field goal, etc. The remaining time during the football game is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, etc. While it may indeed be entertaining to sit in a stadium for three hours for a one hour football game, many people who watch a video of a football game find it difficult to watch all of the game, even if they are loyal fans. A video summarization of the football video, which provides a summary of the game having a duration shorter than the original football video, may be appealing to many people. The video summarization should provide nearly the same level of the excitement (e.g. interest) that the original game provided.

Upon initial consideration, football would not be a suitable candidate to attempt automated video summarization. Initially, there are nearly an endless number of potential plays that may occur which would need to be accounted for in some manner. Also, there are many different types of plays, such as a kickoff, a punt, a pass play, a kickoff return, a running play, a reverse play, an interception, a sack, etc., that likewise would need to be accounted for in some manner. In addition, each of these plays involves significant player motion which is difficult to anticipate, difficult to track, and is not consistent between plays. Moreover, the ball would normally be difficult, if not impossible, to track during a play because much of the time it is obscured from view. For example, it would be difficult to distinguish interesting play related activity from typical pre-play activity of the players walking around the field getting ready for the next play. Based upon such considerations has been previously considered impractical, if not impossible, to attempt to summarize football.

It is conceivably possible to develop highly sophisticated models of a typical football video to identify potentially relevant portions of the video. However, such highly sophisticated models are difficult to create and are not normally robust. Further, the likelihood that a majority of the highly relevant portions of the football video will be included in such a video summarization is low because of the selectivity of the model. Thus the resulting video summarization of the football game may simply be unsatisfactory to the average viewer.

Video Content Including Sports

It may be observed that many different types of video content, including for example sporting events, include a game or activity that lasts a significant period of time of which only a relatively short duration of which turns out to include time during which interesting activity is occurring. The time during which interesting action is occurring is normally the exciting part of the game, such as for example, a kickoff, a hike, a pass play, a running play, a punt return, a punt, a field goal, etc. The remaining time during the video content is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, inter-bout changes of players, pre-bout exercises and ceremonies, post-bout ceremonies, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to watch for several hours for a one hour activity, many people who watch a video of a sporting event find it difficult to watch all of the event, even if they are loyal fans. A video summarization of the video, such as sporting videos, which provides a summary of the event having a duration shorter than the original video, may be appealing to many people. The video summarization should provide nearly the same level of the excitement (e.g. interest) that the original game provided.

As previously discussed, upon initial consideration, sporting events would not be a suitable candidate to attempt automated video summarization. Initially, there are nearly an endless number of potential plays that may occur which would need to be accounted for in some manner. Also, there are many different types of plays, that likewise would need to be accounted for in some manner. In addition, each of these plays involves significant player motion which is difficult to anticipate, difficult to track, and is not consistent between plays. Moreover, any balls or other items would normally be difficult, if not impossible, to track during a play because much of the time it is obscured from view. For example, it would be difficult to distinguish interesting play related activity from typical pre-play activity of the participants walking around getting ready for the next play. Based upon such considerations has been previously considered impractical, if not impossible, to attempt to summarize sporting events.

It is conceivably possible to develop highly sophisticated models of a typical activity to identify potentially relevant portions of the video. However, such highly sophisticated models are difficult to create and are not normally robust. Further, the likelihood that a majority of the highly relevant portions of the video will be included in such a video summarization is low because of the selectivity of the model. Thus the resulting video summarization of the event may simply be unsatisfactory to the average viewer.

Play Selection

After consideration of the difficulty of developing highly sophisticated models of a video to analyze the content of the video, as the sole basis upon which to create a summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments in terms of understanding, following, or even appreciating the game is limited. These important portions occur semi-periodically and sparsely during the game, but they contain the moments of intense action and are the essence of a game. The remaining time is typically less important. Therefore preferably the events are selected based upon a "play". A "play" may be defined as a sequence of events defined by the rules of the event. In particular, and in one aspect, the sequence of events of a "play" may generally include the time between which the players set up to start an activity and the time during which the activity is completed. A play may also selectively include certain pre-activity ceremonies or events. Normally the "play" should include a related series of activities that could potentially result in a victory by one contestant and a loss by the other contestant.

It is to be understood that the temporal bounds of a particular type of "play" does not necessarily start or end at a particular instance, but rather at a time generally coincident with the start and end of the play or otherwise based upon, at least in part, a time (e.g., event) based upon a play. A summarization of the video is created by including a plurality of video segments, where the summarization includes fewer frames than the original video from which the summarization was created. A summarization that includes a plurality of the plays of the event provides the viewer with a shorted video sequence while permitting the viewer to still enjoy the event because most of the exciting portions of the video are provided, preferably in the same temporally sequential manner as in the original video. In addition, it is to be understood that although summarization often achieves compression at the same time, it is different from video coding which aims at representing the original video with less data. In fact, summarization may be considered more concerned about the compact representation of the "content" in the video, whereas video coding is more concerned about representing the video signal itself as accurately and as bandwidth-efficient as possible.

Play Detection

Referring to FIG. 1A, a model of a class of sports video in terms of play is shown. The play portion is a basic segment of time during which an important action occurs in the game. The non-play is a segment of time during which a non-important action occurs in the game, or otherwise not determined to be a play. The inner loop illustrated in dashed lines indicates the possibility that two plays may occur consecutively or with a relatively short time period between the two plays.

Figure 1B:
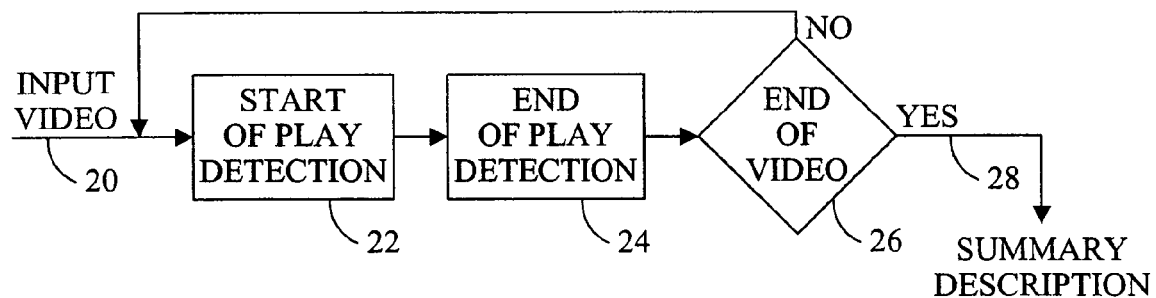
FIG. 1B is an exemplary flowchart for play detection.

Referring to FIG. 1B, a procedure for summarization of a video includes receiving a video sequence 20 that includes material to be summarized, where the content preferably includes at least a portion of a game or sporting event. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

One component of the summarization procedure depicted in FIGS. 1A and 1B is the detection of an event, or "play." If the start and end points of all plays are detected, then the system may string all the plays together to obtain a summary from the original video and perform some post processing to smooth the transition boundaries, such as using dissolving techniques to reduce abrupt change between plays and smoothing the audio filed for better auditory effects. Further, the summary should ideally contain only those segments comprising a "play" as earlier defined (or portions of plays), thus providing a compact representation of the original tournament. With a compact representation the user can spend less time watching it while maintaining most of the excitement of the original game.

One of the difficulties in the detection of a "play" in a sporting broadcast is the detection of the events. However, the present inventors have come to the realization that for sporting broadcasts, and other broadcasts, the general video capturing and production patterns that have been adopted by virtually all of the broadcast companies permits the detection of the events. Hence, relatively low-level visual features may be used for event detection that are relatively invariant.

With the summarization being determined based upon low-level characteristics of the video, the system should detect an event (e.g., a play). In contrast to a generic summarization scheme which uses for example color histograms as the cue for key frame detection or scene classification, the different plays may contain colors which sweep a large range of color (in terms of histogram), yet all the frames belong to the same event, and may be used to form an uninterrupted video clip.

Football Play Detection

The present inventors then considered how to detect a "play" from a football video in a robust, efficient, and computationally effective manner. After extensive analysis of a typical football game it was determined that a football game is usually captured by cameras positioned at fixed locations around the football field, with each camera typically capable of panning, tilting, and zooming. Each play in a football game normally starts with the center hiking the ball, such as toward the quarterback or kicker. Further, a hiking scene, in which the center is about to hike the ball, is usually captured from a camera location to the side of the center. This camera angle is typically used because it is easier to observe the movements of all of the parties involved (the offense, the center, the quarterback, the receivers, the running back, and the defense) from this viewpoint. Thus a play typically starts with a frame such as shown in FIG. 2.

While an attempt to determine a hiking scene may include complex computationally intensive analysis of the frame(s) to detect the center, the quarterback, or the kicker, and the offense/defense, together with appropriate motion, this generally results in non-robust hiking scene detection. To overcome this limitation the present inventors were dumbfounded to recognize that the scenes used to capture a football video typically use the same set of camera angles. The football game normally includes cameras sitting either on one side of the field and on the two ends of the field. The side cameras are normally located in the stadium above the 25, 50, and 25 yard lines, and the two end cameras are located at the ends of the fields. There may be additional cameras, such as handheld cameras, but most of the events are captured by the side cameras and the end cameras. In general there are two different types of plays, namely, place kicks and regular plays (e.g., plays that are not place kicks). In general, place kicks (which include the kick-offs, extra point attempts, and field goal attempts) are usually captured by a camera near the end of the field, while a regular play (including runs, passes, and punts) is usually captured by a side camera. It is also noted that a kick-off is usually captured by an end camera followed by a side camera. Accordingly, the different plays of a football video may be categorized as one of two different types of plays, namely, a place kick, and a regular play.

Figure 2:
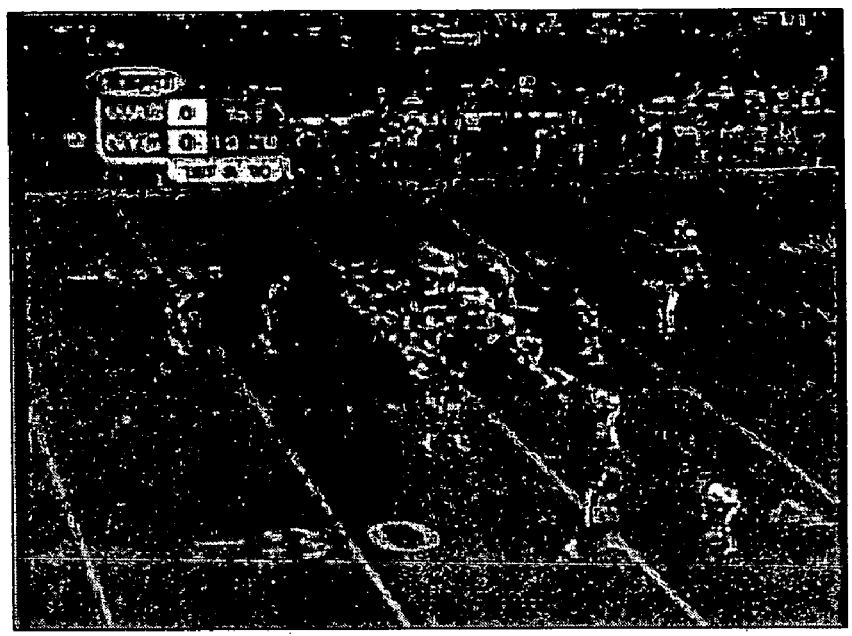
FIG. 2 is an exemplary illustration of a hiking scene in football.

The regular play typically starts with a frame such as that shown in FIG. 2. The camera then follows the ball until the ball is called dead, at which time the current regular play ends. After the end of the regular play there is typically a camera break, at which time the camera views other activity, such as the commentators or the fans. The time between the camera break and the start of the next play is usually not exciting and thus should not be included in the summary.

Figure 3:
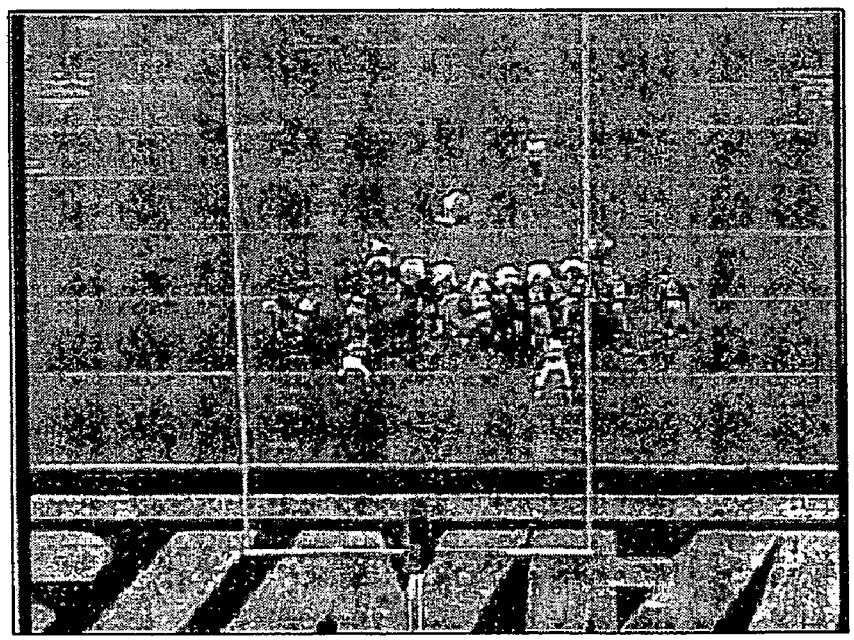
FIG. 3 is an exemplary illustration of a kicking scene in football.

The place kick typically starts with a frame such as that shown in FIG. 3, and it normally ends with a camera break, in a manner similar to the regular play. For the place kick, there are normally more than one camera break before the end of the play, such as for example, a first camera break at the switch from the end camera to the side camera, and a second camera break when the play ends.

To determine a start of a play, such as those shown in FIGS. 2 and 3, the present inventors considered criteria that may be suitable to characterize such an event. The criteria to determine the start of the play is based on anticipated characteristics of the image, as opposed to analyzing the content of the video to determine the actual events. One criteria that may be used to determine the start of a play is the field color. Under the assumption that a camera provides a typical start frame like those shown in FIG. 2 or 3, it may be observed that the field has a generally green color. Accordingly, a characteristic of the start of a play may be if a sufficient spatial region of the frame has the generally green color. The sufficient spatial generally green region may be further defined by having shape characteristics, such as substantially straight edges, a set of substantially parallel edges, a four-sided polygon, etc. Further, the spatial region of the generally green color is preferably centrally located within the frame. Thus, it would initially appear that the start of a play can be detected by locating frames with a generally green dominant color in the central region. The aforementioned color test is useful in detecting the start of a play. However, after further analysis it was determined that merely detecting the generally green dominant color centrally located is sufficient but may be insufficient for a robust system. For example in some implementations, a dominant generally green color may be a necessary condition but not a sufficient condition for determining the start frame of play.

For example, the color characteristic of a central spatial generally green region may exist when the camera is focused on a single player on the field prior to a play. In addition, the precise color of the generally green color captured by the camera varies from field to field, from camera to camera, and from day to night. In fact, even for a given game, since it may start in late afternoon and last into early evening, the lighting condition may change, causing the generally green color of the same field to vary significantly during the video. Moreover, the generally green field color is typically not uniform and includes variations. Thus it is preferably not to use a narrow definition of the generally green color (e.g., excluding other non-green specific colors). Therefore, it is preferable to use a broad definition of generally green. If a broad definition of a generally green color is used, such as ones that includes portions of other colors, then a greater number of non-play scenes will be identified.

Figure 4:
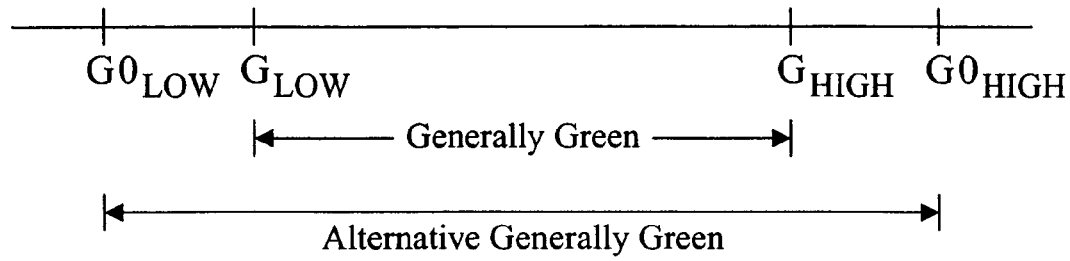
FIG. 4 illustrates one example of a generally green color region.

With the generally green color of the field not being constant, it is desirable to calibrate the generally green color for a specific football video. Further, it is desirable to calibrate the generally green color for a specific portion of a football video, with the generally green color being recalibrated for different portions of the football video. Referring to FIG. 4, using the hue component in the HSV color space as an example, the preferred system provides a range of generally green colors, such as $G_{low}$ and $G_{high}$, with generally green being defined there between. The $G_{low}$ and/or $G_{high}$ may be automatically modified by the system to adapt to each particular football video and to different portions of the video.

With the variation of the field color even within a game, the present inventors determined that a color histogram $H_g$ of the generally green color in addition to a range given by $G_{low}$ and $G_{high}$, provides a more accurate specification of the field color. The $H_g$ may calibrated for a specific football video. Also $H_g$ may be calibrated for a specific portion of the football video, with the $H_g$ being recalibrated for different portions of the football video. Even with two frames of the video showing the field the resulting color histograms will tend to be different. Thus, it is useful to estimate the extent to which the field color histograms vary in a particular football video, or portion thereof. It is preferable to use the field scenes, however detected, from which to estimate the color histograms.

Figure 5:
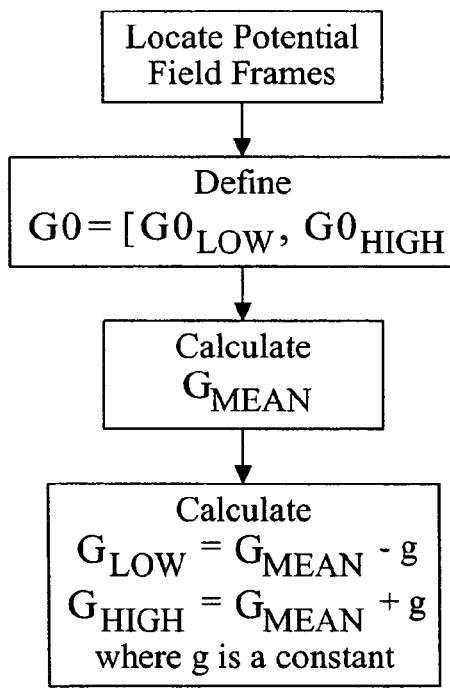
FIG. 5 is a technique for defining the generally green color region.

The following technique may be used to determine $G_{low}$, $G_{high}$, and $H_g$. Referring to FIG. 5, for all (or a portion of) the frames containing the field all the generally green pixels are located. For this initial determination preferably the generally green pixels are defined to include a large interval. The interval may be defined as $G0=[G0_{low}, G0_{high}]$. Next a statistic measure of the generally green pixels is calculated, such as the mean hue green value $G_{mean}$ of all the pixels. Next $G_{low}$ and $G_{high}$ may be set. One technique for setting $G_{low}$ and $G_{high}$ is: $G_{low}=G_{mean}-g$, $G_{high}=G_{mean}+g$, where g is a constant such that $G_{high}-G_{low}<G0_{high}-G0_{low}$. In essence, the technique narrows (i.e., reduces its gamut) the range of generally green colors based on color based information from the football video.

Figure 6:
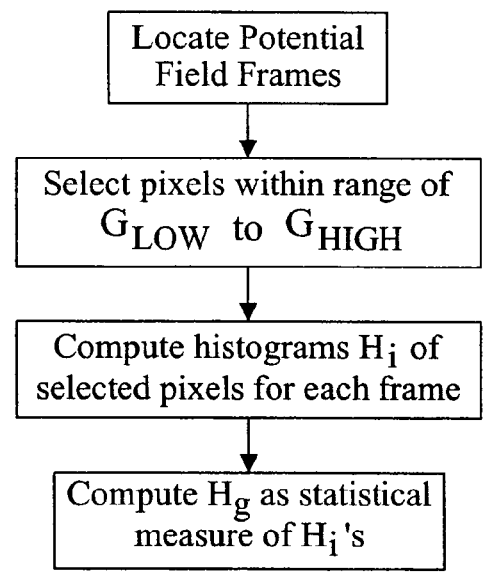
FIG. 6 is a technique for defining histograms for the field frames.

The following technique may be used to determine the color histogram $H_g$. Referring to FIG. 6, all (or a portion of) the frames containing the field are selected. Within these field frames all (or a portion on) the pixels falling in the range of $G_{low}$ and $G_{high}$ are selected. Other ranges of generally green colors may likewise be used. The color histogram $H_i$ for each of these sets of pixels in each of the frames is then determined. Then $H_g$ is computed as a statistical measure, such as the average, of all the calculated color histograms $H_i$. In particular the variation of $H_g$ may be calculated as follows:

For any frame containing the field, compute the error between $H_i$ and $H_g$:

$e_i = \|H_g - H_i\|$ where $\|\bullet\|$ is the $L_1$ norm.

The sample mean is computed as:

$$m_e = \frac{1}{N} \sum_i e_i$$

The sample standard deviation of all the errors is calculated as:

$$v = \sum_i ((e_i - m_e)^2 / (N-1))^{1/2}$$

with N being the number of frames, v being a measure for evaluating how a color histogram is different from the average $H_g$.

With the green color being calibrated, the system may test if a frame is likely the start of a play by checking the following two conditions:

(1) if the frame has more than $P_1$% generally green pixels;
(2) if the color histogram $H_1$ of these generally green pixels is close enough to Hg.

The first condition may be examined by counting the number of pixels whose hue value falls in $G_{low}$, $G_{high}$. The second condition may be examined by checking if the difference between $H_1$ and $H_g$ is smaller than a threshold, i.e., if $\|H_1 - H_g\| < T_h$. The threshold Th may be determined as:

$T_h = m_e + c \cdot v$, where c is a constant, typically 3 or 4.

If both conditions are satisfied, then a potential start is detected, and this frame may then be further checked by other modules if it is desirable to confirm a detection. If however, the frame has only more than $P_2$% green pixels ($P_2 < P_1$), and the second condition is satisfied, then the field line detection module described later should be used to increase the confidence of an accurate determination of a potential start of a play.

Figure 7:
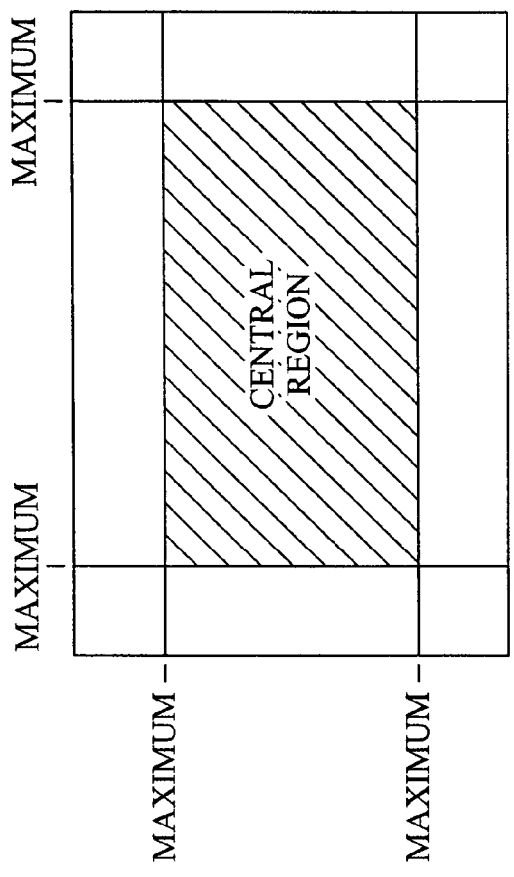
FIG. 7 illustrates the definition of a central region of a frame and/or field.

After consideration of actual frames of the start of a play in football videos the present inventors observed that sometimes the start frames contain non-field regions on the top and the bottom, and further may contain editing bars on the side or on the bottom. These factors are not especially compatible with the use of the thresholds $P_1$ and $P_2$, as previously described. For the thresholds $P_1$ and $P_2$ to be more robust, only the center region (e.g., primarily generally within such non-field regions and editing bars) of the frame should be used when computing the percentages. Referring to FIG. 7, the center region may be defined as follows:

(1) scan a frame row-by row, starting from the first row, until a row that has dominant generally green pixels is located, or until a predetermined maximum is reached, whichever occurs first;
(2) scan the frame row-by-row, starting from the bottom row, until a row that has dominant generally green pixels is located, or until a predetermined maximum is reached, whichever occurs first;
(3) scan the frame column-by-column, starting from the right column until a column that has dominant generally green pixels is located, or until a predetermined maximum is reached, whichever occurs first;
(4) scan the frame column-by-column, starting from the left column until a column that has dominant generally green pixels is located, or until a predetermined maximum is reached, whichever occurs first;
(5) the locations at which the scanning stopped (e.g., found the dominant generally green color or otherwise a predetermined maximum), defines the central region of the frame.

The preferred predetermined maximums are ¼ of the row number as the constant in the scanning of the rows and ⅙ of the column number as the constant in the scanning of the columns.

After further consideration of the football video, the present inventors likewise observed a pattern exhibited by the football video at the start of a play, namely, the field lines. The presence of the field lines is a strong indication of the existence of a corresponding field being viewed by the camera. The field lines may be characterized by multiple substantially parallel spaced apart substantially straight lines or lines on a contrasting background. The field lines may alternatively be characterized by multiple spaced apart generally white lines. In addition, the field lines may be characterized as a pattern of lines on a background primarily a generally green color. Also, the field lines may be further constrained as being of a sufficient length relative to the size of the field or image. In the preferred system, the field lines are characterized as two, three, or four of the above. This length consideration removes shorter lines from erroneously indicating a field. The identification of the frames of video representing fields using the field lines may be used as the basis for the color calibration, if desired.

Figure 8:
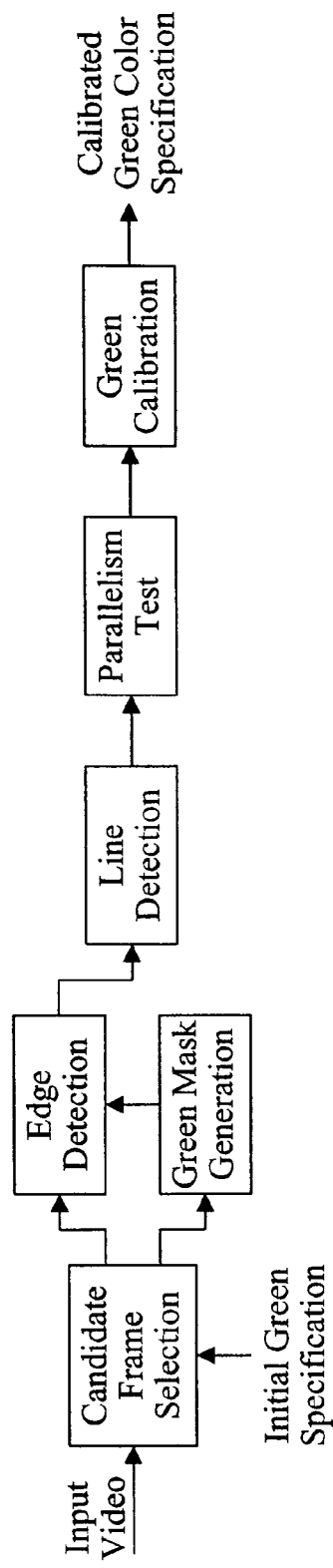
FIG. 8 illustrates candidate frame selection based upon an initial generally green selection.

Referring to FIG. 8, the preferred system includes candidate frame selection by using an initial green specification, such as $G0 = [G0_{low}, G0_{high}]$. Then those frames with a primary color G0 are identified. A green mask may be obtained by setting a value of "1" to locations defined by the G0 color and "0" to the other locations. The green mask may then be diluted, if desired, to allow the inclusion of small regions adjacent to the green G0 region. The edge detection may then be performed on the frames followed by filtering with the green mask. This step is intended to eliminate those edge pixels that are not on the generally green background. A line detection is then performed on the filtered edge map, such as with a Hough transform, to get lines that are longer than $L_{min}$. It is to be understood that any suitable technique may be used to identify the lines, and in particular the lines within a generally green background.

Figure 11:
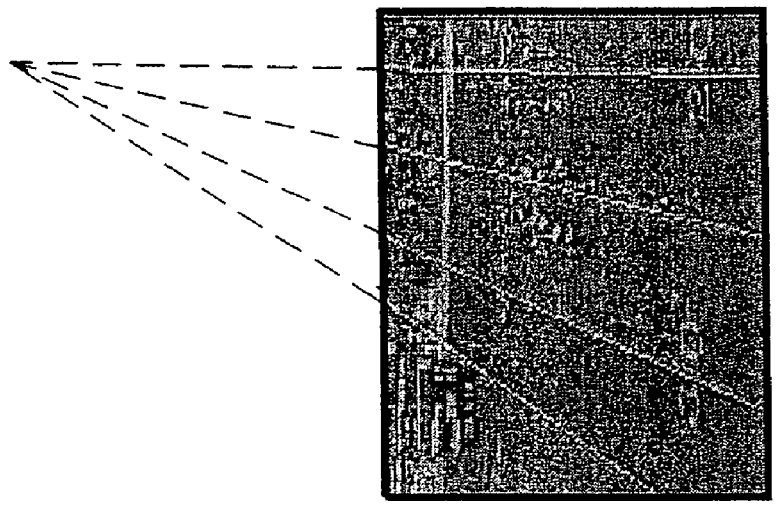
FIG. 11 illustrates parametric lines for the edge detection of FIG. 10.
Figure 10:
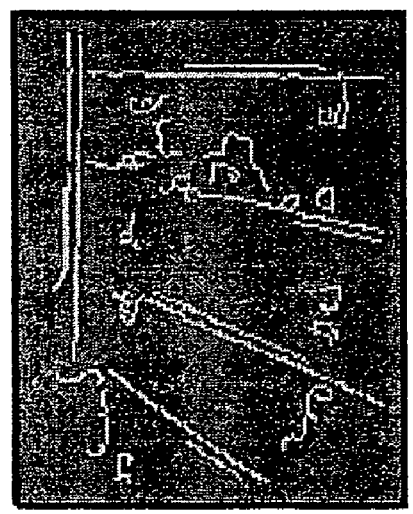
FIG. 10 illustrates edge detection for the image in FIG. 9.
Figure 9:
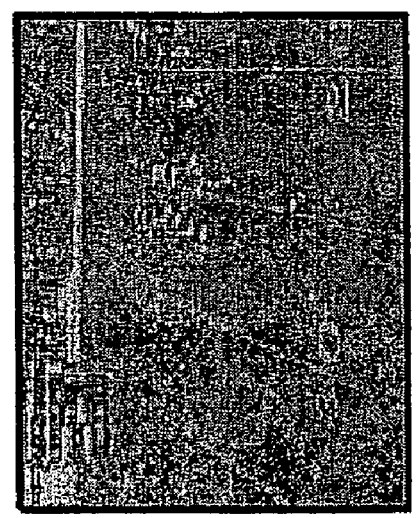
FIG. 9 is an exemplary illustration of a hiking scene in football.

After experimentation with the line detection scheme there remains a small probability that such line detection will result in false positives, even in a generally green background. The present inventors further considered that an image of a field from a single viewpoint results in some distortion of the parallel alignment of the field lines. In particular, a plurality of the field lines will appear to converge at some point (or points). Preferably, all of the field lines will appear to pass through approximately the same disappearing point since the field lines are parallel to one another on the field. Referring to FIG. 9, a sample frame is shown. Referring to FIG. 10, the result of the edge detection is shown. Referring to FIG. 11, the parametric lines along the vertical direction are illustrated, with the lines passing generally through the same point.

In the preferred system, the condition that is used is detecting at least three lines that pass through approximately the same point when projected. This additional condition, especially when used in conjunction with previous field line determination, significantly decreases the likelihood of false positives. Similarly, when the frame is from an end camera, such as shown in FIG. 3, the field lines would appear to be nearly horizontal and parallel to each other in the image domain, which is likewise a test for determination of a field. As shown in FIG. 8, in either case (side view of the field or end view of the field) the task is to test if the lines are parallel in the physical world, and this is referred to as the parallelism test. After the parallelism test the green may be calibrated and the start of a play may be determined based upon these characteristics.

The present inventors observed that there are some cases where the field may contain multiple regions of clay which is of generally brown color. The color calibration technique described above can be similarly applied to deal with these cases so that the system can handle fields of generally green color, fields of generally green and generally brown colors, and fields of generally brown color. Other techniques may likewise be applied to the generally brown, or generally brown and generally green.

The present inventors observed that in many cases the two teams are lined up and most of the motion stops before the start of a play. At this point, the camera motion may tend to zoom in to get an improved picture and stays focused on the players until the play starts. Thus at the moment right before a play starts, there will tend to be no significant motion in the image domain (neither camera-induced motion nor player motion). Therefore, the present inventors determined that the camera motion may be used as an additional indicia of the start of a play. In many instances, a start-of-play will induce a zooming in camera motion that then stops zooming with the scene being free from significant motion. This is another characteristic that may be used to indicate the start of plays. This technique may likewise be used in conjunction with other techniques to decrease false positives.

Figure 12:
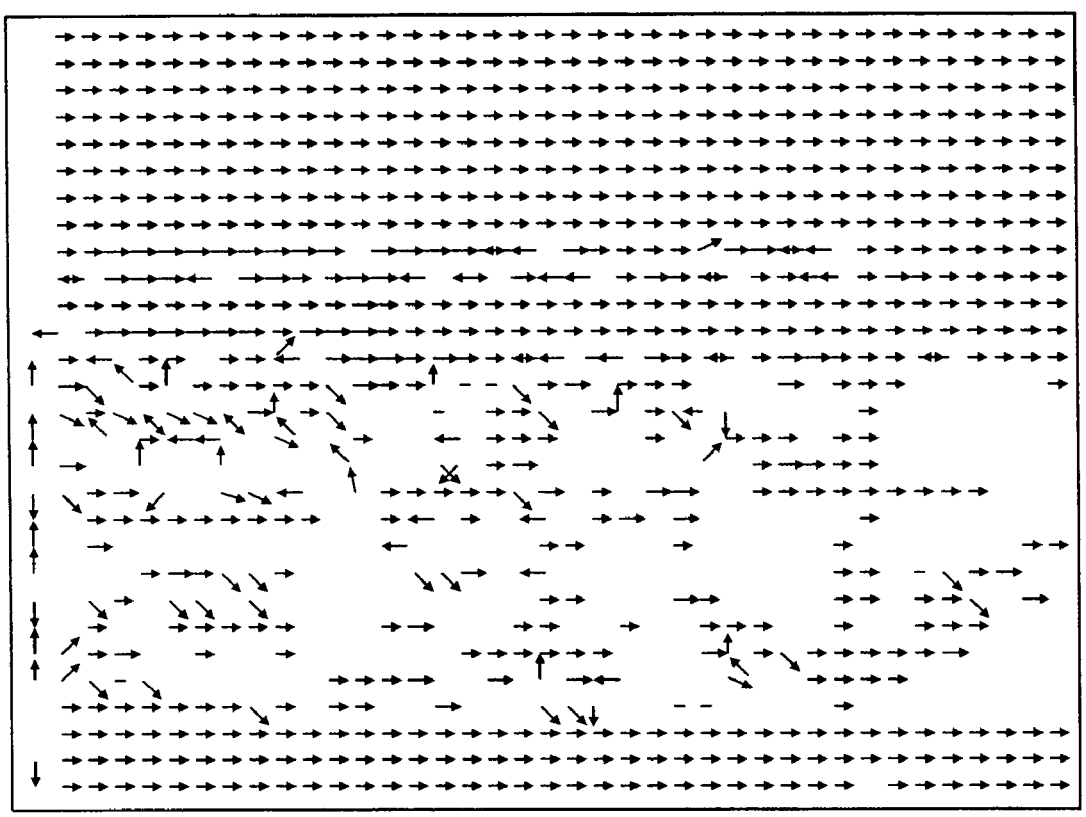
FIG. 12 illustrates computed motion vectors for football video.

There are several techniques that may be used for estimating camera motion. Some methods such as optical flow estimation may provide dense motion fields and hence provide relatively accurate motion estimation results. However, optical flow techniques and similar techniques, are computationally expensive. A less computationally expensive technique is to infer the camera motion from block-based motion compensation. In addition, the motion information is available without additional computation if the system is operating on compressed streams of encoded video, such as a MPEG-like bitstream. It has been determined that the translational motion can be accurately estimated from the motion vectors whereas zooming is not accurately estimated from the motion vectors. The inaccuracy of the motion vectors for zooming may be based on the varying rate of zooming and the scale changes induced by zooming. Therefore, the motion information is preferably used in the following manner: if the camera motion is not primarily translational, the system waits additional frames to confirm the start of a play; otherwise, the start-of-play is declared as long as other conditions are satisfied. A waiting period in the first has dual functions: firstly, it excludes from the summary some frames when the camera is zooming before a start of the play; and secondly, it makes the detection of the start-of-play more robust since more frames have been used to confirm the detection. FIG. 12 illustrates an example of computed motion vectors, when the camera is switched on after a play has started. It is not difficult to deduce that the camera is panning in this situation, based on the primary direction of the motion vectors. In this case a start-of-play may be declared.

As illustrated in FIGS. 2 and 3, in a start-of-play frame, the players appear as scattered blobs in the image. The blobs may be represented by their color and/or texture, and compared against a model of the anticipated color and/or texture for a player. The color and/or texture may be varied, based on the particular team's clothing. In this manner, the system is customizable for particular teams. In the case that there are scattered non-generally green blobs their color characteristics may be compared against a model. In addition, the system may determine, using other techniques, to determine potential start of play frames and use these frames as the basis to calculate color histograms for the players.

Figure 13:
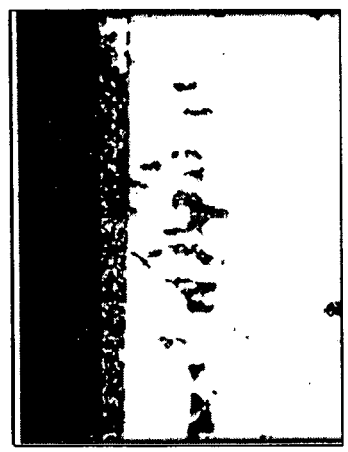
FIG. 13 illustrates an exemplary start of a football play.
Figure 14:
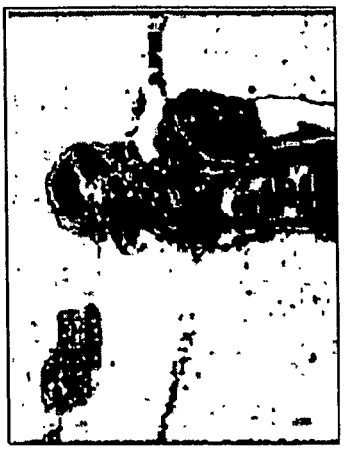
FIG. 14 illustrates a green mask for the image of FIG. 13.
Figure 15:
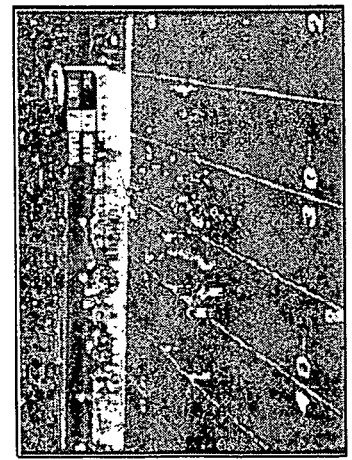
FIG. 15 illustrates an exemplary green mask for an image of a football player.
Figure 16:
FIG. 16 illustrates an exemplary football player.
Figure 17:
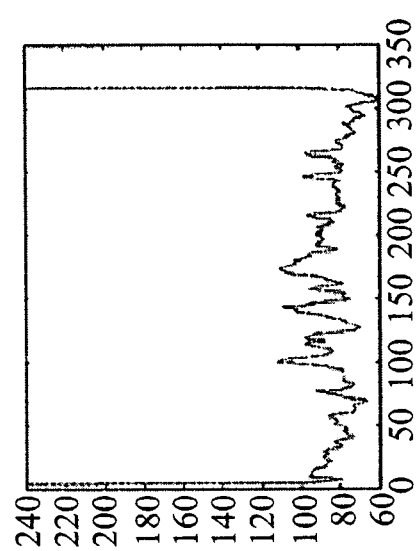
FIG. 17 illustrates a projection of the green mask of FIG. 14.
Figure 18:
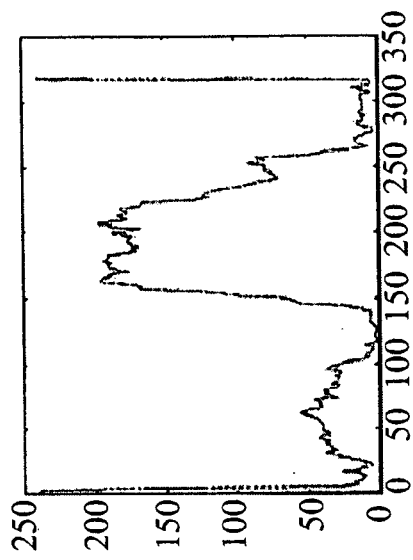
FIG. 18 illustrates a projection of the green mask of FIG. 15.

Referring to FIG. 13, at the start of the football play the each of the teams tend to line up in some manner. This line up of the players may be used as a characteristic upon which to determine the start of a play. The characteristic of a suitable line up of players includes a generally aligned set of non-generally green blobs (e.g., regions), such as the green mask shown in FIG. 14, as previously described. Further, the blobs should have a relatively small size, especially in relation to the size of the field. In contrast, a relatively large non-generally green blob, such as the green mask shown in FIG. 15, is more likely indicative of a close up of a player, such as shown in FIG. 16. To characterize the spatial distribution of the non-generally green regions the green masks may be projected into x and y directions, such as shown in FIG. 17 and FIG. 18. A high and wide peak in the projection, as shown in FIG. 18, is less likely to indicate the start of a play than a generally low set of peaks, as shown in FIG. 17. Another approach for analyzing the line up of players may be determining two distinctive groups of blobs lining up along both sides of a "line" that is parallel to the field lines.

Figure 19:
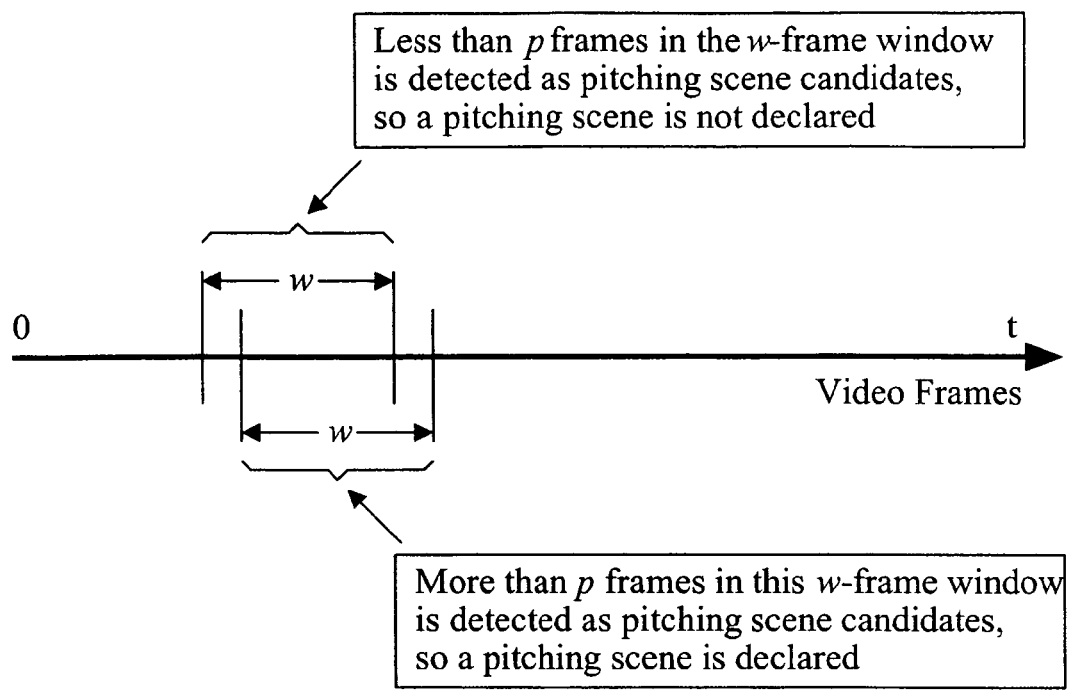
FIG. 19 is an illustration of temporal evidence accumulation.

After further consideration, the present inventors determined that if a hiking scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 19, the following approach may be used to achieve temporal evidence of accumulation: when detecting a hiking scene, a sliding window of width w is used (e.g., w frames are considered at the same time). A hiking scene is declared only if more than p out of the w frames in the current window are determined to be hiking scene candidates, as previously described. A suitable value of p is such that p/w=70%. Other statistical measures may be used of a fixed number of frames or dynamic number of frames to more accurately determine hiking scenes.

Figure 20:
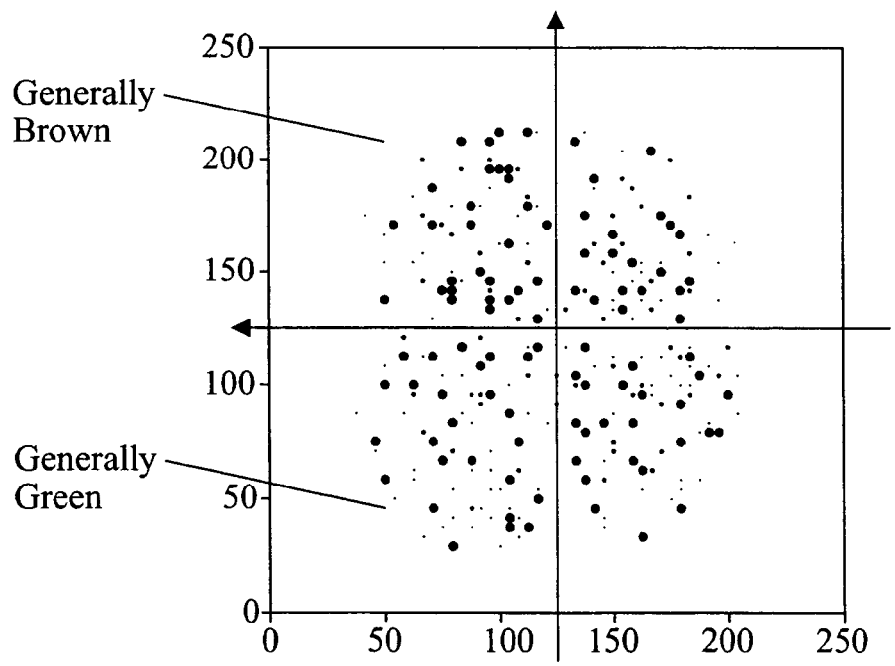
FIG. 20 is an illustration of the U-V plane.

To define the "generally green" color any color space may be used. The preferred color space is the HSV color space because it may be used without excessive computational complexity. Alternatively, a YUV color space may be used as shown in FIG. 20.

While the start of a "play" may be defined as a hiking scene the end of a play, according to the rules of football, can end in a variety of different ways. Image analysis techniques may be used to analyze the image content of the frames after a hiking frame to attempt to determine what occurred. Unfortunately, with the nearly endless possibilities and the difficultly of interpreting the content of the frames, this technique is at least, extremely difficult and computationally intensive. In contrast to attempting to analyze the content of the subsequent frames of a potential play, the present inventors determined that a more efficient manner for the determination of the extent of a play in football is to base the end of the play on camera activities. After analysis of a football video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 21A:
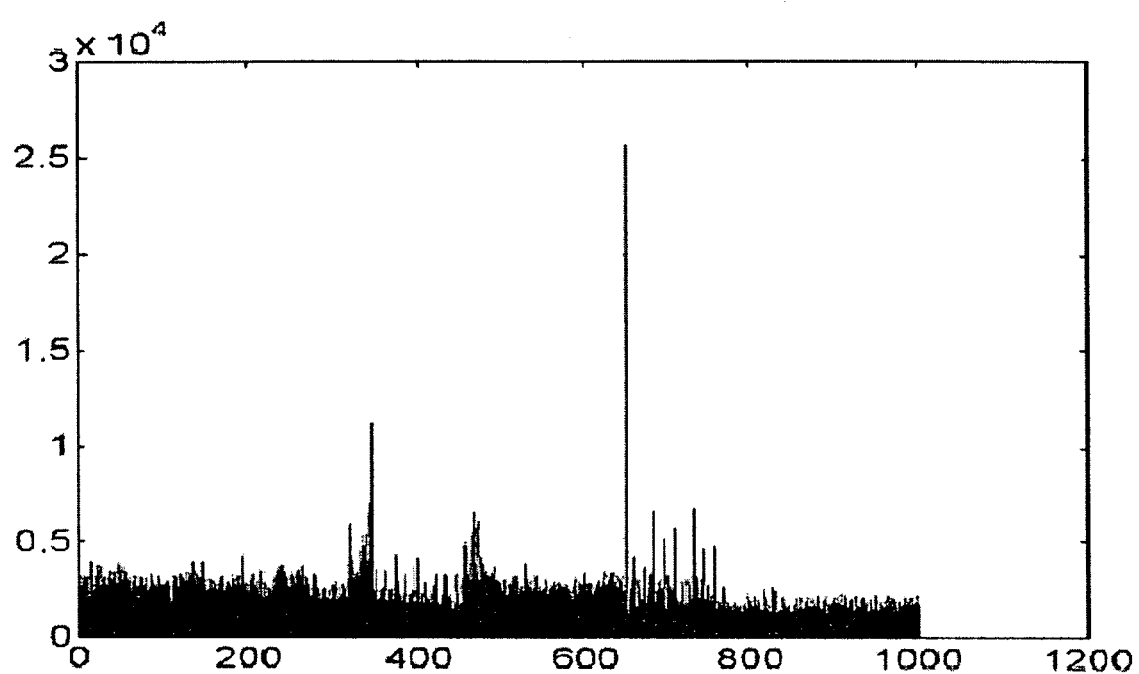
FIG. 21A illustrates changes between frames.

Referring to FIG. 21A, a model of the amount of change between frames using a color histogram difference technique for an exemplary 1,000 frame video football clip is shown. The peaks typically correspond to scene cuts. The system may detect an end of play at around frame 649 by thresholding the color histogram difference. A gradual transition occurs around frame 350.

As previously noted the scene cuts may be detected by thresholding the color histogram differences. The selection of the an appropriate threshold level to determine scene cuts may be based on a fixed threshold, if desired. The appropriate threshold level may be calculated for each football video, either after processing a segment of the video or otherwise dynamically while processing the video. One measure of the threshold level may be based upon the mean m and the standard deviation σ of the frame-to-frame color histogram differences from the whole video. The threshold Tc can be calculated as m+cσ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

When the system is used in an "on-line" environment the entire video is not available for processing. When used in an on-line environment the threshold Tc may be computed based upon m and σ for the currently available (or a portion thereof) frames. In addition, to reduce computational complexity, the frames in a single play may be used upon which to calculate m and σ.

Figure 21B:
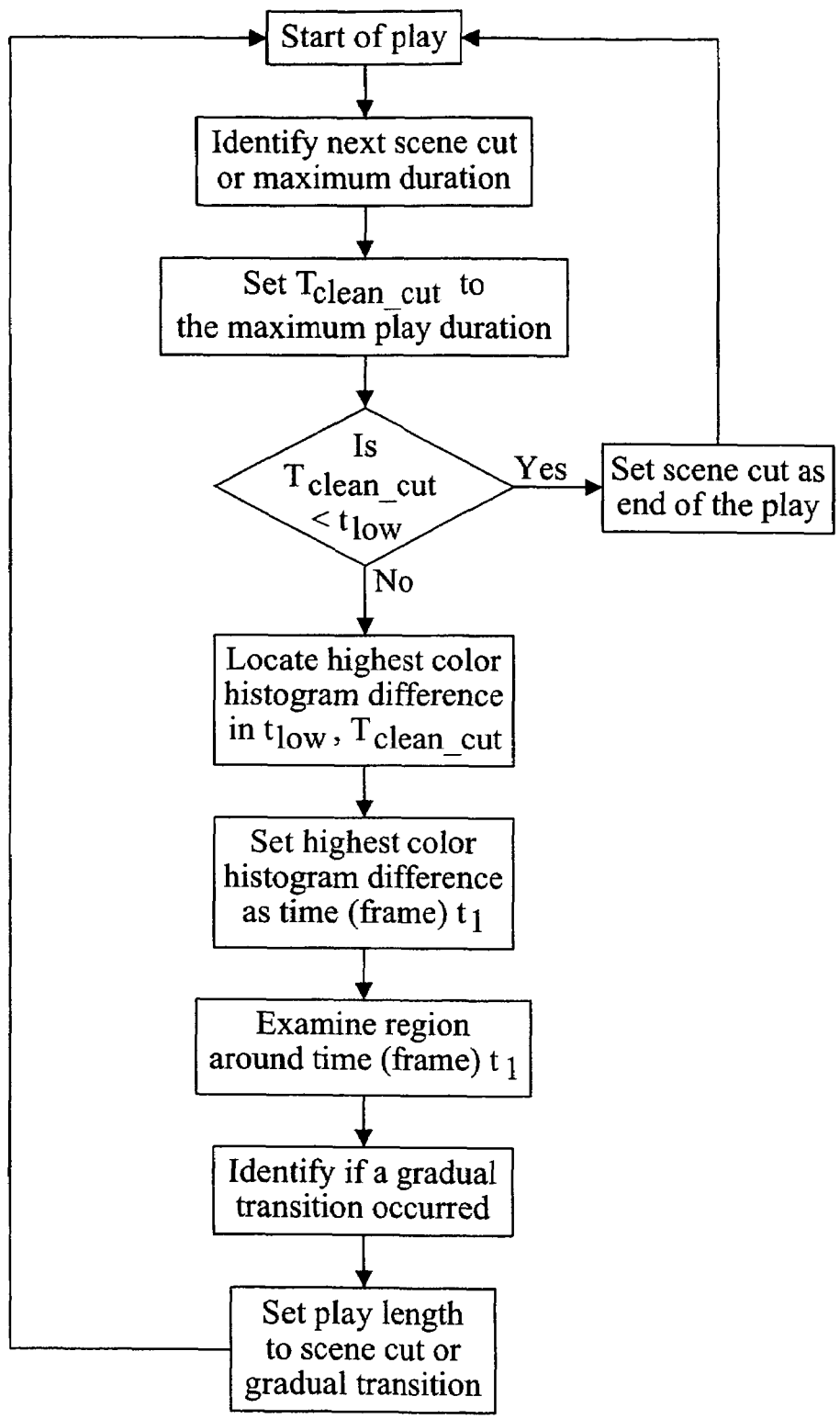
FIG. 21B is an illustration of detecting the end of a play in football.
Figure 22A:
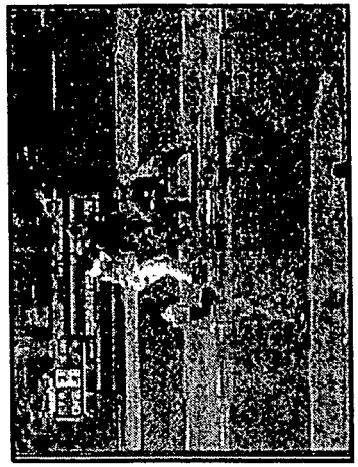
FIGS. 22A-22F illustrates the start of a baseball play.
Figure 22B:
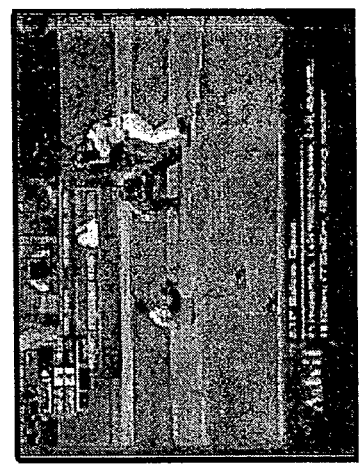
Figure 22C:
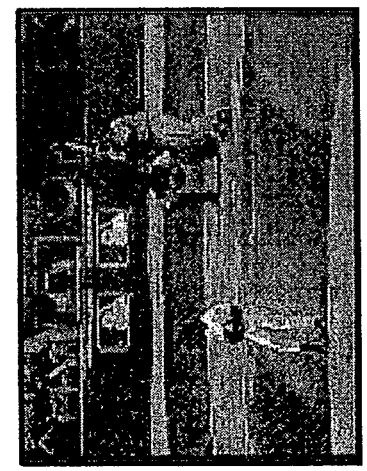
Figure 22D:
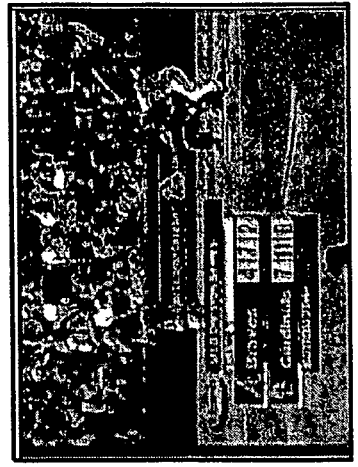
Figure 22E:
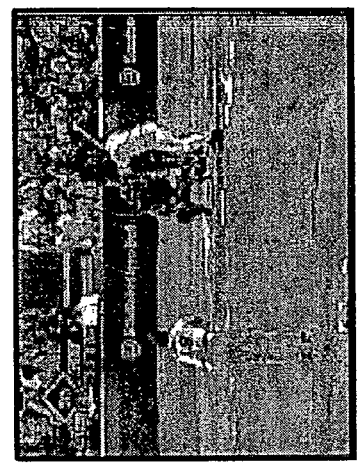
Figure 22F:
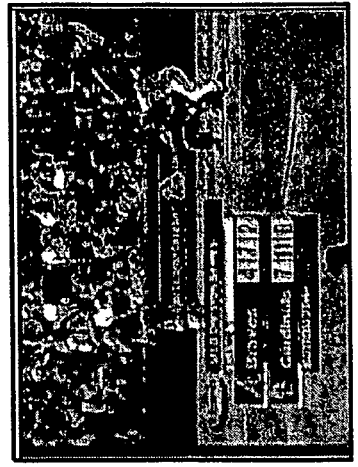

Football video tends to include gradual transitions between plays and other activities, such as commentary. These gradual transitions tend to be computationally complex to detect in the general case. However, in the case of football it has been determined that detecting gradual transitions based upon the color histogram differences is especially suitable. Other techniques may likewise be used. Referring to FIG. 21B, the preferred technique may include starting from a start-of-play time ($t_o$) and looking forward until a sufficiently large scene change is detected or until time $t_o+t_p$ is reached, whichever occurs first. $T_p$ relates to the maximum anticipated play duration and therefore automatically sets a maximum duration to the play. This time period for processing to locate gradual transitions is denoted as $t_{clean\_cut}$. If $t_{clean\_cut} < t_{low}$ then the system will not look for a gradual scene cut and set the previously detected scene cut as the end of the play. This corresponds to an anticipated minimum time duration for a play and $t_{low}$ is used to denote the minimum time period. Otherwise, the system looks for the highest color histogram difference in the region $t_{low}$, $t_{clean\_cut}$ or other measure of a potential scene change. This region of the segment is from the minimum time duration to the next previously identified scene cut. This identifies the highest color histogram difference in the time duration which may be a potential scene change. The time of the highest color histogram difference is identified at $t_1$. In a neighborhood of $t_1$, $[t_1-c_1, t_2+c_2]$, a statistical computation is performed, such as computing the mean $m_1$ and the standard deviation a of the color histogram differences. $C_1$ and $c_2$ are constants or statistically calculated temporal values for the region to examine around the highest color histogram difference. A mean filtering emphasizes regions having a relatively large difference in a relatively short time interval. If the color histogram differences at $t_1$ exceeds $m_1+c_3*\sigma_1$, where $c_3$ is a constant (or otherwise) and some of its neighbors (or otherwise) are sufficiently large, then the system considers a gradual transition to have occurred at around time (frame) $t_1$. The play is set to the shorter of the previously identified scene cut or the gradual transition, if any.

Besides the technique of using field lines to assist in calibrating the field colors, there are other techniques of color calibration. For example, the calibration may be performed by a human operator or by the system with the assistance of a human operator. The system may perform automatic calibration by using appropriate statistical techniques. A simple technique is as follows. If the system has obtained a set of hiking scene candidates, the system can estimate the color histograms for green colors from these candidates. Under the assumption that most of the candidates are true hiking scene frames, the system can detect statistical outliers in this set. The system then uses the remaining candidate frames to estimate the specifics of the colors. With the green colors calibrated the system can perform both the start-of-play detection and the end-of-play detection more accurately.

Baseball Play Detection

The present inventors also considered how to detect a "play" from a baseball video in a robust, efficient, and computationally effective manner. After extensive analysis of a typical baseball game it was determined that a baseball game is usually captured by cameras positioned at fixed locations around the baseball field, with each camera typically capable of panning, tilting, and zooming. Each play in a baseball game normally starts with the pitcher releasing the ball, such as toward the catcher or toward one of the basemen. Further, a pitching scene, in which the pitcher is about to throw the ball, is usually captured from a camera location behind the pitcher. This camera angle is typically used because it is easier to observe the movements of all of the parties involved (the pitcher, the batter, the catcher, and the umpire) from this viewpoint. Thus a play typically starts with a frame such as shown in FIGS. 22A-22F.

While an attempt to determine a pitching scene may include complex computationally intensive analysis of the frame(s) to detect the pitcher, the batter, the catcher, and the umpire, together with appropriate motion, this generally results in non-robust pitching scene detection. To overcome this limitation the present inventors were dumbfounded to recognize that the lower portion of a typical pitching frame includes at least one region of generally green colors (grass or artificial turf), and at least one region of generally brown colors (e.g., soil). Normally the lower portion of a typical pitching frame for different fields includes these colors because the pitching mound and batting region are soil, with the region in between being grass or artificial turf. In addition, a typical pitching frame includes two regions of generally brown and/or two regions of generally green. A frame with one region of each color is sufficient.

Also, the present inventors observed that a typical pitching frame includes at least three regions of different colors arranged in alternating dominant horizontally oriented bands. Further, these three or more different color regions are typically generally green and generally brown in color. It is to be understood that the colors may be different depending on the particular anticipated colors, and that all the colors may be different. Depending on the camera angle the pitching scene may have the generally green color at the bottom of the frame or may have the generally brown color at the bottom of the frame. The colors preferably alternate between generally green (or brown) and generally brown (or green). There may be regions of other colors in addition to the generally green and generally brown. Accordingly, the preferred criteria is that the colors should be dominant along the horizontal axis while alternating in the vertical direction for a lower portion of the frame. In addition, the lower portion of the frame may be defined as the lower 75% of the frame, the lower 66% of the frame, the lower 50% of the frame, or the lower 30% of the frame, if desired. It is to be understood that the regions may be arranged in other patterns, as desired. Also, it is to be understood that the location of these regions within the frame may be arranged at other portions of the frame, such as the middle third of the frame, the upper third of the frame, the lower third of the frame, the right half of the frame, the left half of the frame, the central region of the frame, etc. An alternative characterization may be identification of at least three regions of sufficient spatial coherence and sufficient horizontal extent.

Figure 23:
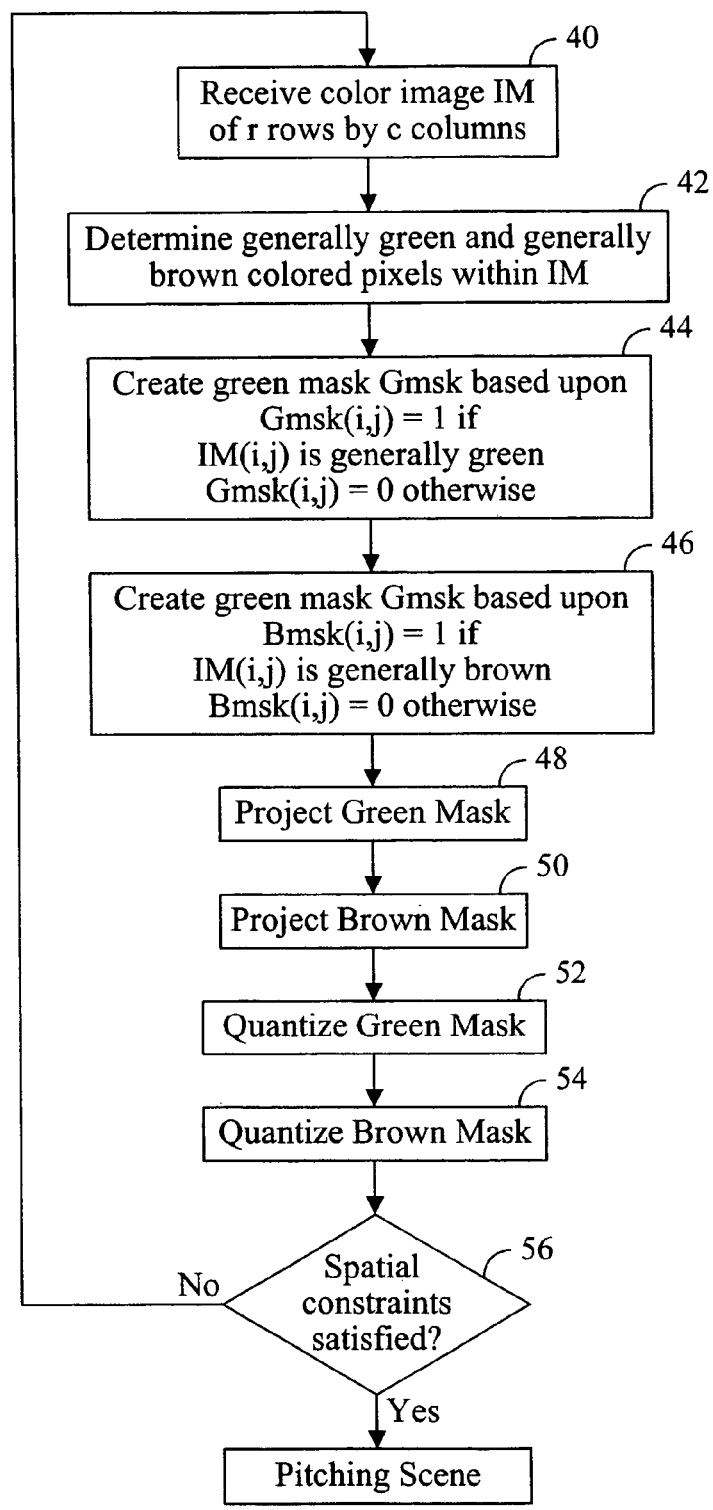
FIG. 23 illustrates one technique for play detection for baseball.

Referring to FIG. 23, based on these observations, the following technique may be used for detecting the pitching scene. Block 40 receives a color image IM of r rows by c columns. Block 42 determines the generally green and generally brown colored pixels within the color image IM. Block 44 creates a green mask Gmsk, with each location assigned a value based upon whether or not the corresponding pixel was generally green. In essence, the Gmsk identifies those pixels of the color image IM that are sufficiently green. Block 46 creates a brown mask Bmsk, with each location assigned a value based upon whether or not the corresponding pixel was generally brown. In essence, the Bmsk identifies those pixels of the color image IM that are sufficiently brown. The result of blocks 44 and 46 is to identify those regions of the color image IM that have colors of interest.

Block 48 projects the green mask Gmsk onto the vertical axis, such as in the manner of a histogram. The green projection may be calculated as $$Gproj(i) = 1/c \sum_j Gmsk(i,j) \text{ for } i=1,\ldots,r.$$

The projection on the vertical axis Gproj(i) is suitable for identification of significant horizontal regions of the image that correlate to regions of the color image IM that are sufficiently green. Block 50 projects the brown mask Bmsk onto the vertical axis, such as in the manner of a histogram. The brown projection may be calculated as $$Bproj(i) = 1/c \sum_j Bmsk(i,j) \text{ for } i=1,\ldots,r.$$

The projection on the vertical axis Bproj(i) is suitable for identification of significant horizontal regions of the image that correlate to regions of the color image IM that are sufficiently brown. The projection technique is used to identify those regions of sufficient spatial coherence and sufficient horizontal extent. It is to be understood that other techniques may likewise be used.

Block 52 quantizes (e.g., binarizes) the green projection. The quantized green projection may be calculated as Gproj(i)=1 if Gproj(i)>p1 and Gproj(i)=0 otherwise, where p1 is a threshold value (static or dynamic). Block 54 quantizes (e.g. binarizes) the brown projection. The quantized brown projection may be calculated as Bproj(i)=1 if Bproj(i)>p 1 and Bproj(i)=0 otherwise, where p1 is a threshold value. The green and brown projections, and especially the binarized green and brown projections, are especially suitable for determining whether the peaks in Gproj and Bproj satisfy the spatial constraints of a pitching scene in block 56. In other words, the desired pattern of generally brown and generally green regions is determined within the frame. If the spatial constraints are satisfied then the frame is considered a pitching frame. If the spatial constrains are not satisfied then the frame is not considered a pitching frame. After extensive testing it has been determined that scenes other than a pitching scene is not likely to have the same constraints, and accordingly such a constraint will be relatively accurate at detecting pitching scenes.

Figure 24:
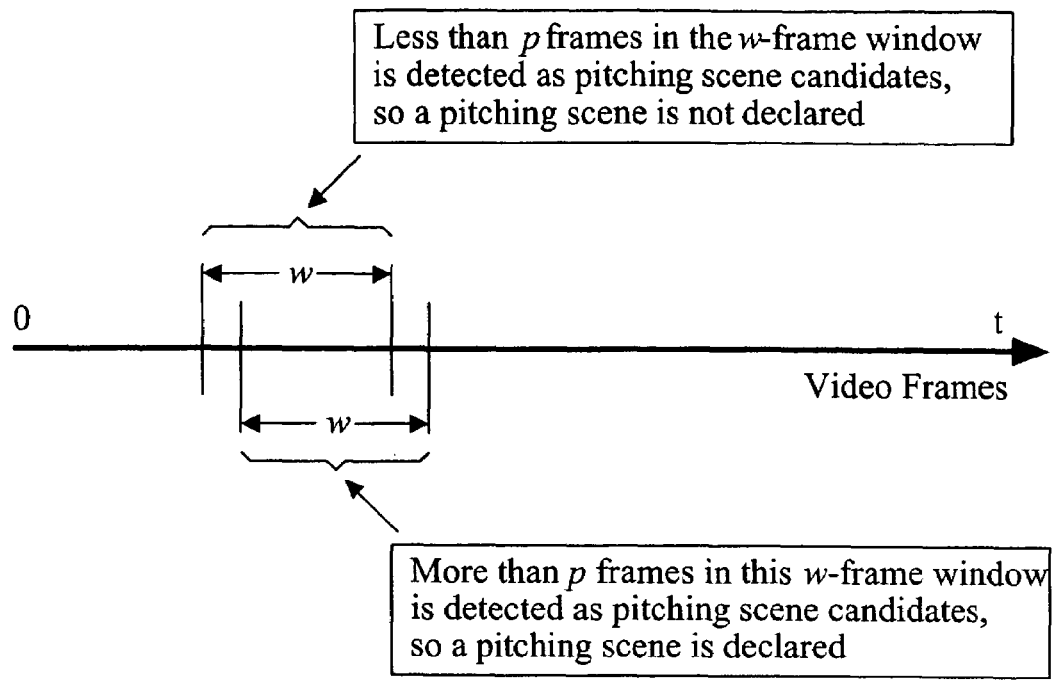
FIG. 24 illustrates a temporal frame validation technique.

After further consideration, the present inventors determined that if a pitching scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 24, the following approach may be used to achieve temporal evidence of accumulation: when detecting a pitching scene, a sliding window of width w is used (e.g., w frames are considered at the same time). A pitching scene is declared only if more than p out of the w frames in the current window are determined to be pitching scene candidates, as previously described. A suitable value of p is such that p/w=70%. Other statistical measures may be used of a fixed number of frames or dynamic number of frames to more accurately determine pitching scenes.

Figure 25:
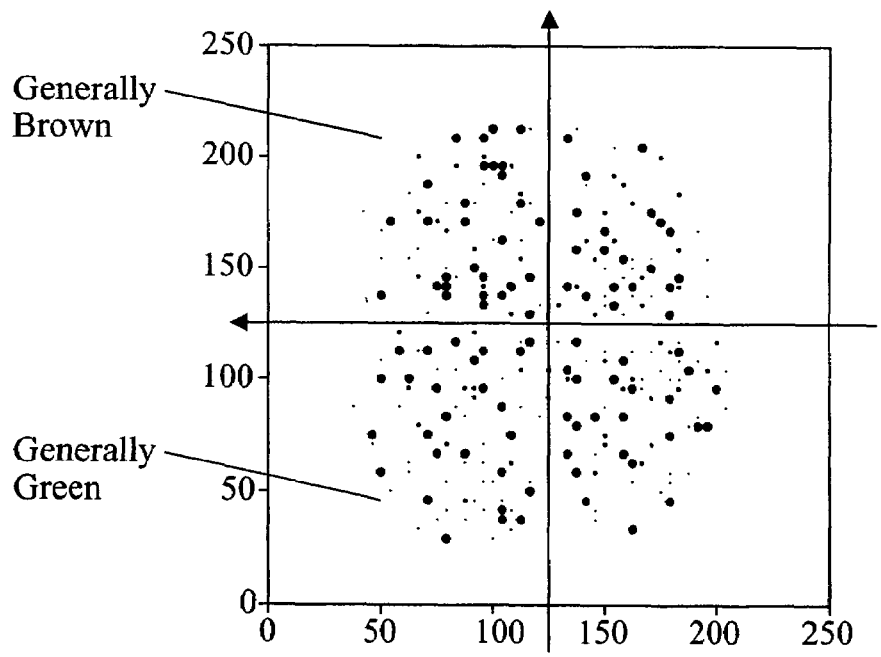
FIG. 25 illustrates color selection for plays.

To define the "generally green" color and the "generally brown" color any color space may be used. The preferred color space is the YUV color space because it may be used without excessive computational complexity. In the event that the input video is a MPEG stream, then the Y, U, V components are directly available after decoding, without further color space conversion. Also, a wide range of green and brown colors can be defined by the lower left quadrant and upper left quadrant of the U-V plane, respectively, as illustrated in FIG. 25. Thus, it is computationally efficient to determine the green and brown masks by comparing the U and V signals to a fixed value, such as 128.

While the start of a "play" may be defined as a pitching scene the end of a play, according to the rules of baseball, can end in a variety of different ways. For example, the play can end with the batter missing the ball, the play can end with a home run, the play can end if the ball is fouled away, the play can end with the batter being thrown out at first base, the play can end with the batter being thrown out at second base, and the play can end with the batter being ejected from the game. Image analysis techniques may be used to analyze the image content of the frames after a pitching frame to attempt to determine what occurred. Unfortunately, with the nearly endless possibilities and the difficultly of interpreting the content of the frames, this technique is at least, extremely difficult and computationally intensive. In contrast to attempting to analyze the content of the subsequent frames of a potential play, the present inventors determined that a more efficient manner for the determination of the extent of a play in baseball is to base the end of the play on camera activities. After analysis of a baseball video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 26:
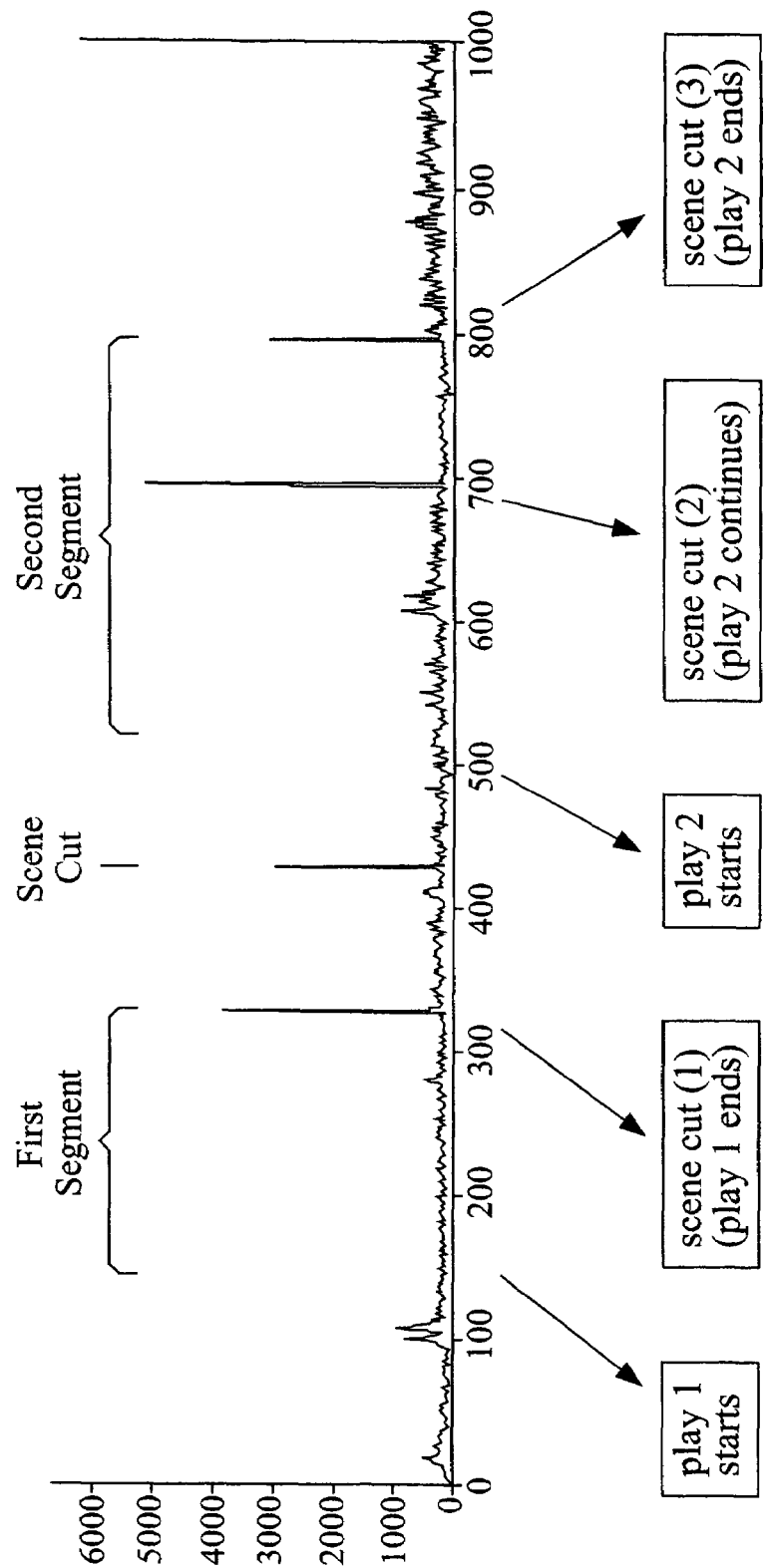
FIG. 26 illustrates the frame breaks between plays.

Referring to FIG. 26, a model of the amount of change between frames using a color histogram difference technique for an exemplary 1,000 frame video baseball clip is shown. The peaks typically correspond to scene cuts. The system may detect a pitching scene at around frame 170. In this particular video clip the batter did not swing, and after the catcher caught the ball, there is a scene cut at frame 322. Accordingly, a first segment may be defined from frame 170 to frame 322. After the pitcher was ready for another throw, the camera was switched back resulting in a scene cut at frame 428. A new pitching scene was detected at frame 520. This time the batter hit the ball, and the camera was switched to follow the flying ball which resulted in scene cut 2. In this case, the play continues, until another scene cut (scene cut 3) when the current play ends and another camera break occurs. As it may be observed, the scene cut (1) properly identifies the end of the first segment in the first pitching scene, while the scene cut (2) does not properly identify the end of the second segment in the second pitching scene. Accordingly, for a more accurate representation of the play it is desirable to distinguish between scene cuts where the play continues and scene cuts where the play ends or has ended. To make this determination, the present inventors determined that most scene cuts where the play continues occurs when the camera is still looking primarily at the field. In this case, the play should continue until a scene cut occurs where the camera is not looking at the field. If after the scene cut the camera is not looking at the field, then the current play ends. The field may be detected in any manner, such as the frame having sufficient generally green or generally brown colors. A flow chart of the technique for detecting the end of a play is shown in FIG. 27.

As previously noted the scene cuts may be detected by thresholding the color histogram differences. The selection of the an appropriate threshold level to determine scene cuts may be based on a fixed threshold, if desired. The appropriate threshold level may be calculated for each baseball video, either after processing a segment of the video or otherwise dynamically while processing the video. One measure of the threshold level may be based upon the mean m and the standard deviation a of the frame-to-frame color histogram differences from the whole video. The threshold can be calculated as $m+c\sigma$ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

Although most plays start with a pitching scene illustrated in FIG. 22, one of the potential plays in baseball starts with a different camera angle, namely, the one for base-stealing. Typically the base stealing camera is directed toward first base (though second and third base are likewise possible). The detection technique may be used to likewise readily detect base stealing frames as the start of a play. In this case the colors tend to be a region of generally brown for the mound, generally green for the field, and generally brown for the field. However, the size of the brown regions are significantly different, which may be used as a basis to characterize the field. Also, the regions tend to encompass the entire frame (or majority).

While very loose color definitions for the colors is permitted, it is possible to calibrate the colors for a specific game. Calibrated colors permits more accurate play detection for a particular video. The calibration may be performed by a human operator or by the system with the assistance of a human operator. The system may perform automatic calibration by using appropriate statistical techniques. A simple technique is as follows. If the system has obtained a set of pitching scene candidates, the system can estimate the color histograms for green and brown colors, respectively, from these candidates. Under the assumption that most of the candidates are true pitching scene frames, the system can detect statistical outliers in this set. The system then uses the remaining candidate frames to estimate the specifics of the colors. With the green and brown colors calibrated, the system can perform both the start-of-play detection and the end-of-play detection more accurately.

At times the pitcher is ready to pitch but the batter is sometimes not yet in position and it takes the batter considerable time to get into position. In this case, the resulting play and thus the summary will contain significant time during which the batter is getting ready. To further refine the start of the play, a batter position module may be used. The module detects whether there are multiple sufficient gaps in the highest green region, and preferably whether the gaps shift with time. The gaps are readily observable in the green mask. If more than two sufficient gaps exist or the gaps shift with time, then the batter is typically not ready. Otherwise the batter is ready.

Sports Play Detection

It is to be understood that other similar techniques may likewise be used to identify plays or otherwise relevant portions of other sporting based videos.

As it may be observed most sports programs may be modeled as a concatenation of "event" and "non-event" video segments, with "event" being defined according to the specific underlying sport (which may or may not include a play or a portion of a play). For example, for American football, an event can be defined as a "play". With this modeling, the principal task of semantic analysis becomes the detection of the events in a video (for a specific sport, richer semantics may be formed on the basis of the events. For example, "Quarters" in football consist of a set of play events). Potential techniques for the detection of events in a video is described above.

American football coaches, both of professional teams and of college teams, routinely use a specific type of video in their training and strategy planning. The specific type of video may be coach preference specific and is normally presented in a consistent manner. This video ("coaching tapes") is typically formed by a human operator by editing video captured from two or three different camera angles during a live game (alternatively an automated or semi-automated technique may be used). Each camera captures all, or otherwise a substantial number, of the plays (or portions thereof) of a game. For example, the most common coaching tape may be referred to as a sideline/end-zone interleaved coaching tape. In such a coaching tape each play (or otherwise a plurality of plays, or majority of plays, or a series of three or more consecutive plays, or a series of five or more consecutive plays) contains a score board shot (SB) (a segment that includes a frame showing the scoreboard), followed by a sideline shot (SL) of the play (a segment that includes a frame showing the field from a location to the side of the field), that is followed by an end-zone shot (EZ) of the same play (a segment that includes a frame showing the field from a location to the end of the field), as illustrated in FIG. 28. In some cases, the end-zone shot is generally directed along the length of the field while the side-zone shot is generally directed across the width of the field. Other variations or combinations of different plays or segments, may be used as desired. A football coach uses not only the coaching tapes from his own team but also uses coaching tapes from other teams, and routinely logs the tapes and adds his own annotations for each play. A coach can use a commercially available logging systems for viewing the coaching tape and adding annotations. The coach, however, has to painstakingly seek the start point of each play/shot/segment before adding annotations to that play/shot.

The coaching tape may be created using the automated segmentation techniques described above, or alternatively any other suitable technique. Alternatively, the coaching tape may be created using manual selection techniques. Therefore, there is a need for automatic parsing of the video in order to identify the segments in some manner to provide quick nonlinear indexing and navigation capabilities, such as for indexing the video.

The automatic parsing of the video sequence is used to detect each play, shot, segment, or set of segments so that the logging system can provide a coach with quick and accurate access points (such as a frame substantially coincident with the start of a play, a shot, or a segment) to each play. In the event that the segmentation is 100% accurate and that the video segments have the precisely anticipated characteristics, the identification may be performed using a suitable technique. Unfortunately, many coaching tapes contain abnormal situations which might be the result of the live production of the tape. For example, some plays may not have the scoreboard shot and some plays may contain more than one scoreboard shot. In addition, many coaches may demand substantially 100% accuracy in the identification. Without sufficient accuracy the annotations may be associated with the wrong plays.

Deterministic Approach

One technique to determine accurate segment identification is a deterministic approach to event identification. This may be applied to the coaching tape, the segment identifications as a result of automated or semi-automated segmentation, the summarized video tape as a result of automated or semi-automated segmentation, or otherwise any suitable tape. A deterministic approach typically involves representing an event in terms of low-level visual and/or audio characteristics. The audio and/or video characteristics are in general sport-specific. For example, for football, field color, camera motion, field lines, etc., may be used. With the characteristics identified, a deterministic approach performs the reasoning based on a set of domain-specific rules, as shown for example in FIG. 29.

For the exemplary coach video, the characteristic features that categorize each of the anticipated shot types are identified: SB, SL, and EZ. Referring again to FIG. 28, it may be observed that the percentage of green pixels in a frame is a useful characteristics for distinguishing a SB shot from SL/EZ shots. In essence, color based characteristics may be used to distinguish a SB shot from SL/EZ shots. Also, the SB shot is typically very short (2-4 seconds), and a SL or EZ shot can be 3-25 seconds long. In essence, the duration of the SB shot relative to the duration of the SL or EZ shot may be used to distinguish a SB shot from a SL or EZ shot. Yet another characteristic that may be used is that a SL/EZ shot typically contains action and thus the last frame of the SL/EZ shot is typically substantially different from the first frame of the same SL/EZ shot, while the first and last frames of a SB shot are substantially the same. Therefore, the difference between the first frame and the last frame of the same shot may be used to distinguish a SB shot from a SL/EZ shot. In some respects, this comparison reflects a shot's motion complexity. In essence, any motion based characteristic (e.g., a measure of change) may be used to distinguish a SB shot from a SL/EZ shot. Another characteristic that governs the underlying semantics is that a play is typically an ordered triplet of <SB-SL-EZ>. This anticipated order provides a semantic constraint that may be used. Alternative semantic constraints of the number of and type of segments may be used. For instance, SL should be preceded by a SB and followed by an EZ.

The following definitions may be defined and then a rule-based technique may be applied.

Pg=Percentage of green pixels in the first few frames (or a selected frame) of the shot;
D=Color histogram difference between the first frame and the last frame of the shot;
L=Length of the shot.

Algorithm I:

```
Loop for the video {
  Step 1. Detect a shot Si.
  Step 2. Compute Pg, D, and L. If Pg, D, and/or L exceed
    pre-determined thresholds, classify Si as a SL or EZ;
    otherwise classify Si as a SB shot.
  Step 3. If Si is a SL/EZ, check the identification of the previous shot
    Si-1
    If Si-1 is SB or EZ, then classify Si as SL;
    if Si-1 is SL, then classify Si as EZ.
}
```

One may also or alternatively use additional cues such as an estimated camera angle (e.g. through field line detection) for further distinguishing a SL shot from a EZ shot, and thus modify Step 3. The thresholds may likewise be modified to include multiple thresholds and comparisons for one or more of the features. For example, even if a shot is shorter than the length threshold for SL/EZ, if the frames are almost totally dominated by green pixels, then it should still be classified as SL/EZ. These additional characteristics may assist in distinguishing between irregular cases, such as those shown in FIG. 30.

Figure 31:
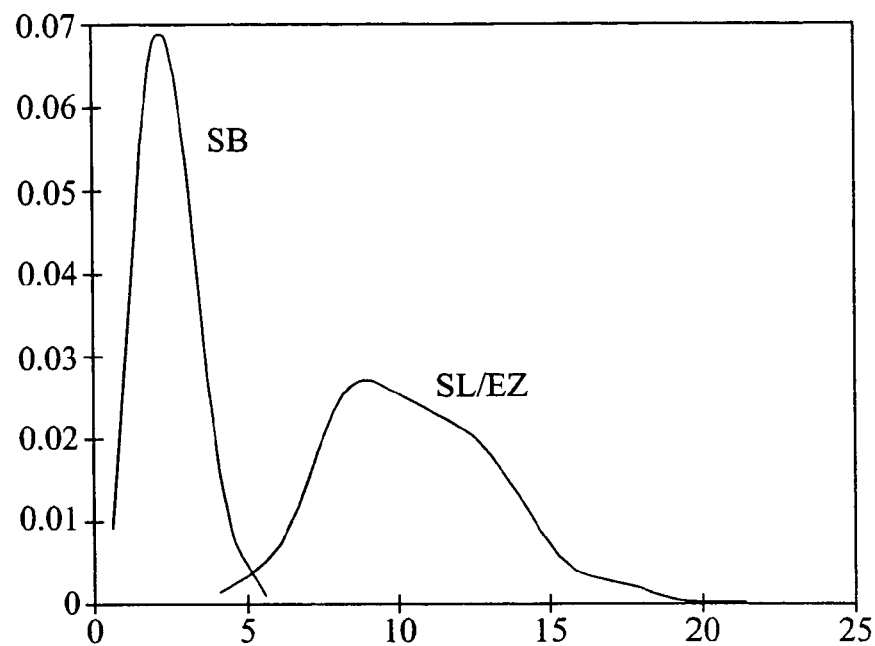
FIG. 31 illustrates empirical length distributions of SB and SL/EZ, respectively.
Figure 32:
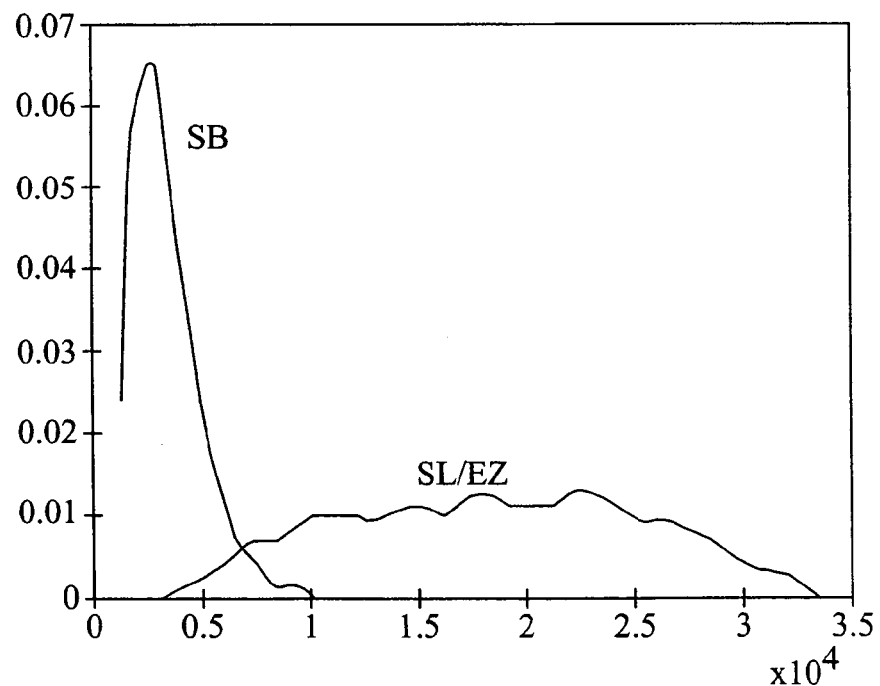
FIG. 32 illustrates empirical D distributions for SB and SL/EZ, respectively, showing significant overlaps.

Deterministic approaches can be very accurate and are computationally efficient. However, there are two significant disadvantages. First, implicitly setting the inference rules may not be easy in some cases, especially when the inference is based on a large number of cues. Second, one has to choose some hard or relativistic thresholds. It is difficult to use a fixed threshold to cover all the variations in real-world video (e.g., some field can have very yellowish grass or with random-colored logo overlays which render the field far from being green). In addition, the length is not always a reliable cue in distinguishing SB from SB/EZ, as shown in FIG. 31. Further, since many plays are short and may lack action (and the camera may shoot from a long range), the resultant D could be as small as, or even smaller than, that of SB shots, as illustrated in FIG. 32. These anomalies render it very difficult to achieve 100% using a rule-based reasoning. In fact, with multiple cues, setting rules and choosing thresholds becomes increasingly intricate as the number of irregular cases grows with each new sequence added to the test.

Probabilistic Approach

Figure 33:
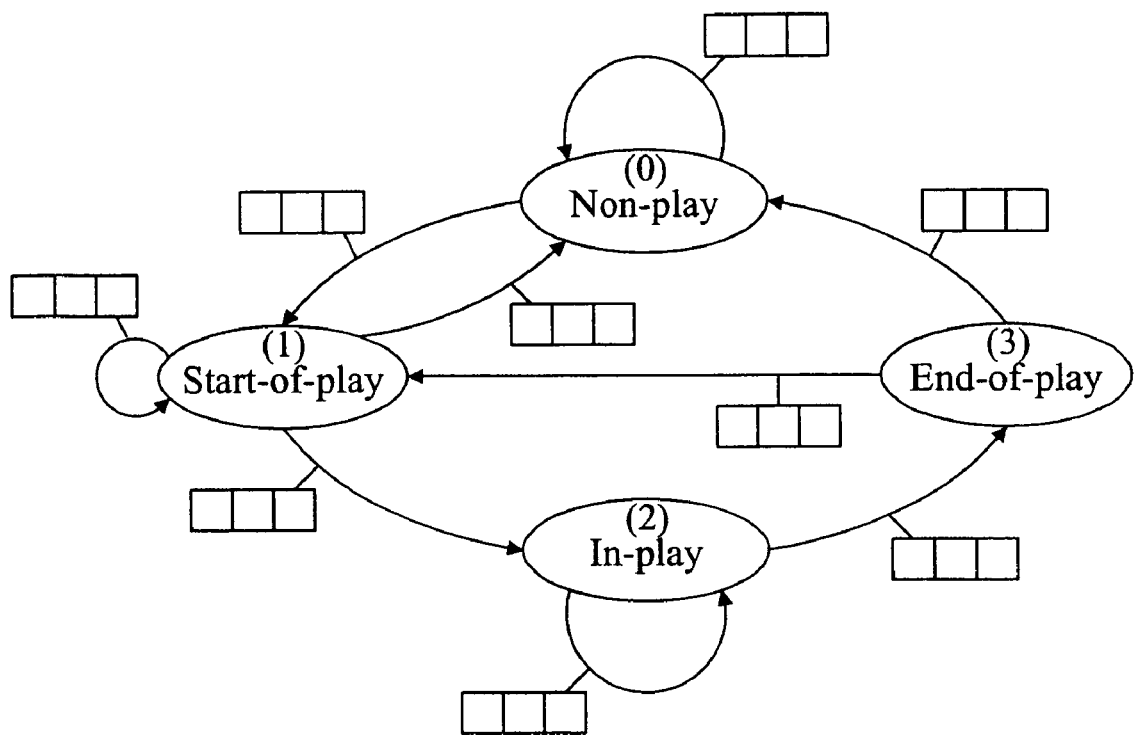
FIG. 33 illustrates a 4 state Hidden Markov Model.

An alternative technique may be used, such as a probabilistic approach. This may be applied to the coaching tape, the segment identifications as a result of automated or semi-automated segmentation, the summarized video tape as a result of automated or semi-automated segmentation, or otherwise any suitable tape. One probabilistic inference approach involves using a Hidden Markov Model (HMM). A straightforward way of using HMM for inference is assuming that shots have been detected, and that each shot is generated with probability by certain underlying state. For example, one can use a four-state HMM shown in FIG. 33, for football play detection, where arrowed lines indicate possible transitions between the states. Training sequences of shots with pre-specified play/non-play segmentation are used to estimate the model parameters. To detect plays in an input video, shots are detected first. Then, the most likely sequence of states is found using the Viterbi algorithm. Plays are detected by identifying sequences of states "(1)-(2)-(3)". Alternative probabilistic type techniques may likewise be used.

The aforementioned HMM probabilistic inference approach relies on a shot detection module (or play or segment or portions thereof) to identify the shots (or pay or segment of portions thereof), and then uses a HMM-based module to do the inference. Another way of using HMM, which addresses both identification and high-level inference, is as follows. For parameter estimation, a feature vector is computed for each frame in training sequences. Each frame in the training sequences is labeled with one of the four states. Parameter estimation for the HMM may be done using Baum-Welch algorithm. The trained HMM is then used to classify each frame of a new sequence. By modifying the model according to domain knowledge and using different feature vectors, one may obtain various algorithms for different sports.

The classification of the events may be based upon the anticipated patterns in the coaching tape using a first-order Markov transition model. One Markov transition model is illustrated in FIG. 34.

The first-order Markov transition model may be defined by letting $P(Z|C)$ be the probability of observing the feature vector Z given shot class C, where Z consists of three components: Pg, D, and L. C takes either of the values in {SB, SL, EZ}. For simplicity, one may assume that the components of Z are independent of each other, and thus have $P(Z|C)=P(Pg|C)P(D|C)P(L|C)$. Now, the individual probabilities $P(Pg|C)$, $P(D|C)$, and $P(L|C)$ can be set empirically or learnt from the data (e.g. using the empirical distributions in FIGS. 31 and 32). An alternative is to set or learn the joint distribution $P(Z|C)$ without the independence assumption, which may require a significant amount of training data since one needs to estimate the 3-D distribution at once.

Figure 34:
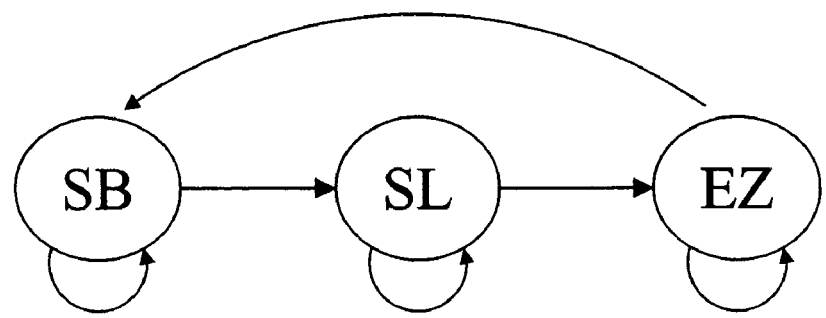
FIG. 34 illustrates a simple first-order Markov transition model for modeling the transitions between SB, SL, and EZ.

A first-order transition matrix $\{Pt(Si|Si-1)\}$ may specify the transition probabilities of FIG. 34. The following algorithm may be used:

Algorithm II:

```
Determine the class Ck0 for shot S0.
Loop for the video {
  Step 1. Detect a shot Si.
  Step 2. Compute Z, and P(Z|Ck) for all k.
  Step 3. Compute P(Z|Ck)Pt(Si|Si-1), and set current shot to
    Ccurr:
      Ccurr = max(k) P(Z|Ck)Pt(Si|Si-1)
}
```

Algorithm II may have a Bayesian interpretation. The problem is to find the most probable state label Ck(Si) for the current shot Si, given a feature vector Z and the state label for the previous shot Si−1, i.e, to maximize P(Ck(Si)|Z) given Cj(Si−1). Applying Bayesian rule yields that <P(Ck(Si)|Z)|Cj(Si−1)> is proportional to <P(Z|Ck(Si))Pt(Si|Si−1)|Cj(Si−1) >. Thus, if no prior information is available, the solution is found by maximizing P(Z|Ck(Si)). Otherwise, when Cj(Si−1) is given, one may maximize P(Z|Ck(Si))Pt(Si|Si−1) with respect to k to find the solution. Note that this algorithm is a simplified case of a full-fledged HMM algorithm. It can be readily extended to a full HMM algorithm.

Figure 35:
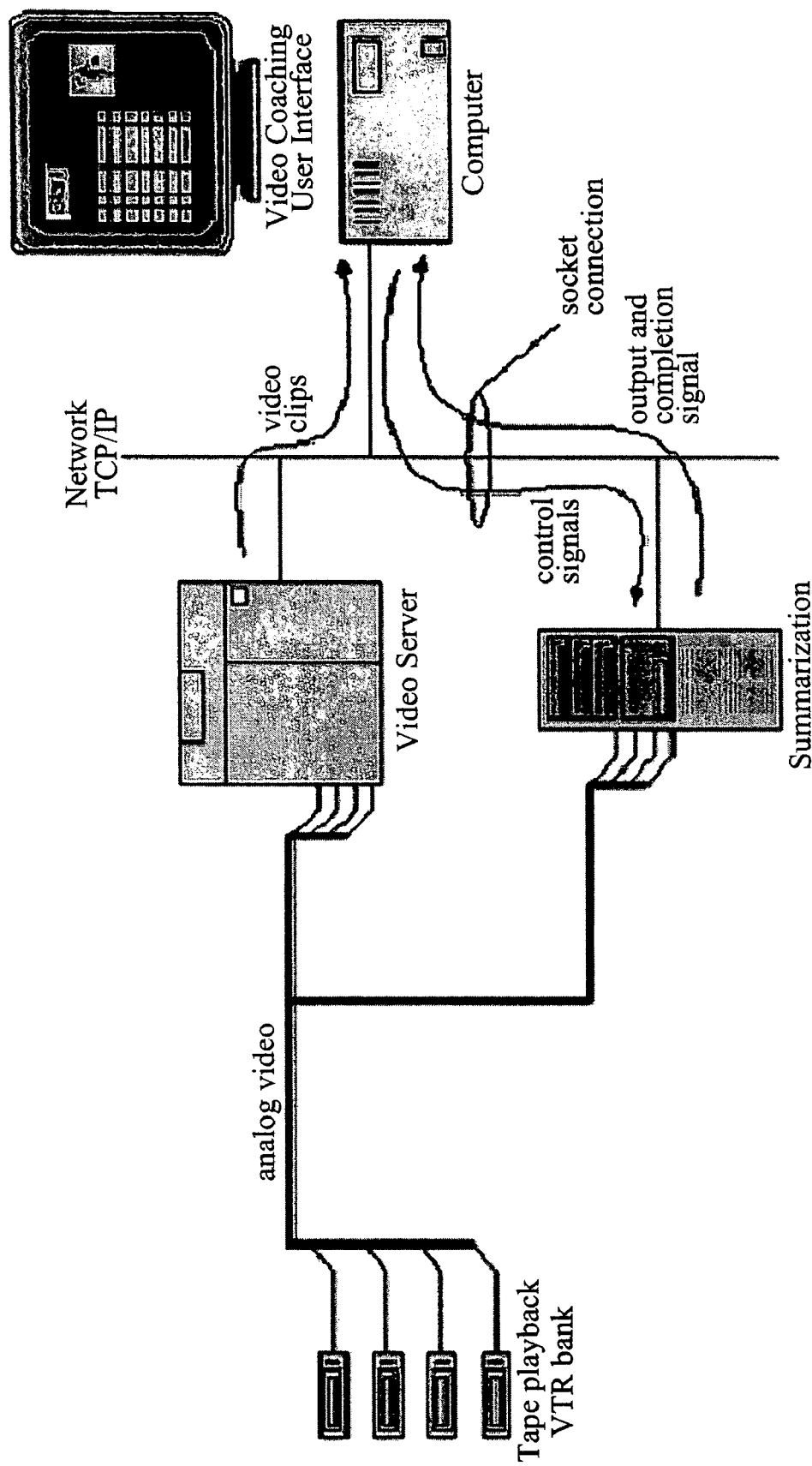
FIG. 35 illustrates a system embodying aspects of the present invention.

While the proposed system can be a stand-alone system, the system and/or the methods can be readily integrated into any existing logging systems in order to add automatic functionalities to those systems. For example, the FIG. 35 illustrates the proposed system integrated into a video coaching system.

All references cited herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of processing a video including a sport comprising:
    (a) a computing device identifying a plurality of segments of said video as displaying a play that is defined by the rules of a sport wherein said play is characterized by a starting and an ending time each also defined by the rules of said sport, said starting time based upon when a play starts and said ending time based upon when the play is considered completed, where each of said segments includes a plurality of frames of said video, wherein said plays are identified by said computer without manual input solely based on said computer analyzing at least one of image and audio characteristics; and
    (b) said computer automatically creating a summarization of said video by including only those ones of said plurality of segments displaying a said play that is defined by the rules of a sport, where said summarization includes fewer frames than said video.

2. The method of claim 1 wherein each of said plurality of segments has a first frame proximate said starting time and a last frame proximate said ending time.

3. The method of claim 1 wherein said start time is temporally proximate a swing.

4. The method of claim 1 wherein said end time is temporally proximate a tackle of a player with the ball.

* * * * *